United States Patent
Lapointe

(10) Patent No.: US 10,370,135 B2
(45) Date of Patent: Aug. 6, 2019

(54) BELT SORTING SYSTEM

(71) Applicant: Robin Lapointe, St Hubert (CA)

(72) Inventor: Robin Lapointe, St Hubert (CA)

(73) Assignees: 3605329 CANADA INC., St Lazare, QC (CA); Robin Lapointe, Greenfield Park, QC (CA)

( * ) Notice: Subject to any disclaimer, the term of this patent is extended or adjusted under 35 U.S.C. 154(b) by 673 days.

(21) Appl. No.: 15/001,163

(22) Filed: Jan. 19, 2016

(65) Prior Publication Data

US 2016/0229575 A1   Aug. 11, 2016

Related U.S. Application Data

(60) Provisional application No. 62/114,509, filed on Feb. 10, 2015.

(51) Int. Cl.

| B65B 5/10 | (2006.01) |
|---|---|
| B65B 57/20 | (2006.01) |
| B65B 35/08 | (2006.01) |
| B65G 47/14 | (2006.01) |
| B65G 15/50 | (2006.01) |
| B65G 15/44 | (2006.01) |
| B65G 21/20 | (2006.01) |

(52) U.S. Cl.
CPC .............. B65B 57/20 (2013.01); B65B 35/08 (2013.01); B65G 47/1471 (2013.01); B65B 5/103 (2013.01); B65G 15/44 (2013.01); B65G 15/50 (2013.01); B65G 21/2036 (2013.01)

(58) Field of Classification Search
CPC .......... B65B 5/10; B65B 5/103; B65B 35/08; B65B 57/20

USPC .............................. 53/473, 475, 244, 52, 54
See application file for complete search history.

(56) References Cited

U.S. PATENT DOCUMENTS

| 1,565,849 A | 12/1925 | Durand | |
|---|---|---|---|
| 1,604,133 A | 10/1926 | Rebechini | |
| 3,558,004 A * | 1/1971 | Boyd, Jr. | ................ A61J 7/02 198/390 |
| 3,913,798 A | 10/1975 | Allen | |
| 3,925,960 A | 12/1975 | Saari et al. | |
| 5,191,741 A | 3/1993 | Jones | |
| 5,463,839 A | 11/1995 | Stange et al. | |
| 5,522,512 A * | 6/1996 | Archer | ................ B07C 5/342 209/580 |
| 6,505,460 B2 | 1/2003 | Aylward | |
| 6,568,151 B2 | 5/2003 | Buckley et al. | |

(Continued)

*Primary Examiner* — Chelsea E Stinson
(74) *Attorney, Agent, or Firm* — Anglehart et al.

(57) ABSTRACT

The object counter is provided which includes a conveyor belt having regularly spaced object retaining posts for retaining single objects on the belt in a lane for transport in single file manner from a lower feed end to an upper discharge end. Each lane has lateral guide members for helping objects to settle in the lane between retaining posts during transport on the conveyor belt between the lower feed end and the upper discharge end. A hopper is arranged at the lower feed end of the conveyor belt for providing a quantity of objects to the conveyor belt. A deflector is arranged over the lane before the upper discharge end for removing objects from the lane that settle on top of objects settled in the lane between said retaining posts. An item detector is arranged at the upper discharge end for detecting the passage or discharge of individual objects.

29 Claims, 25 Drawing Sheets

(56) References Cited

U.S. PATENT DOCUMENTS 7,861,845 B1    1/2011  Lapointe
8,622,196 B1 *  1/2014  Lapointe ................ B65G 33/06
                                                      198/383

* cited by examiner

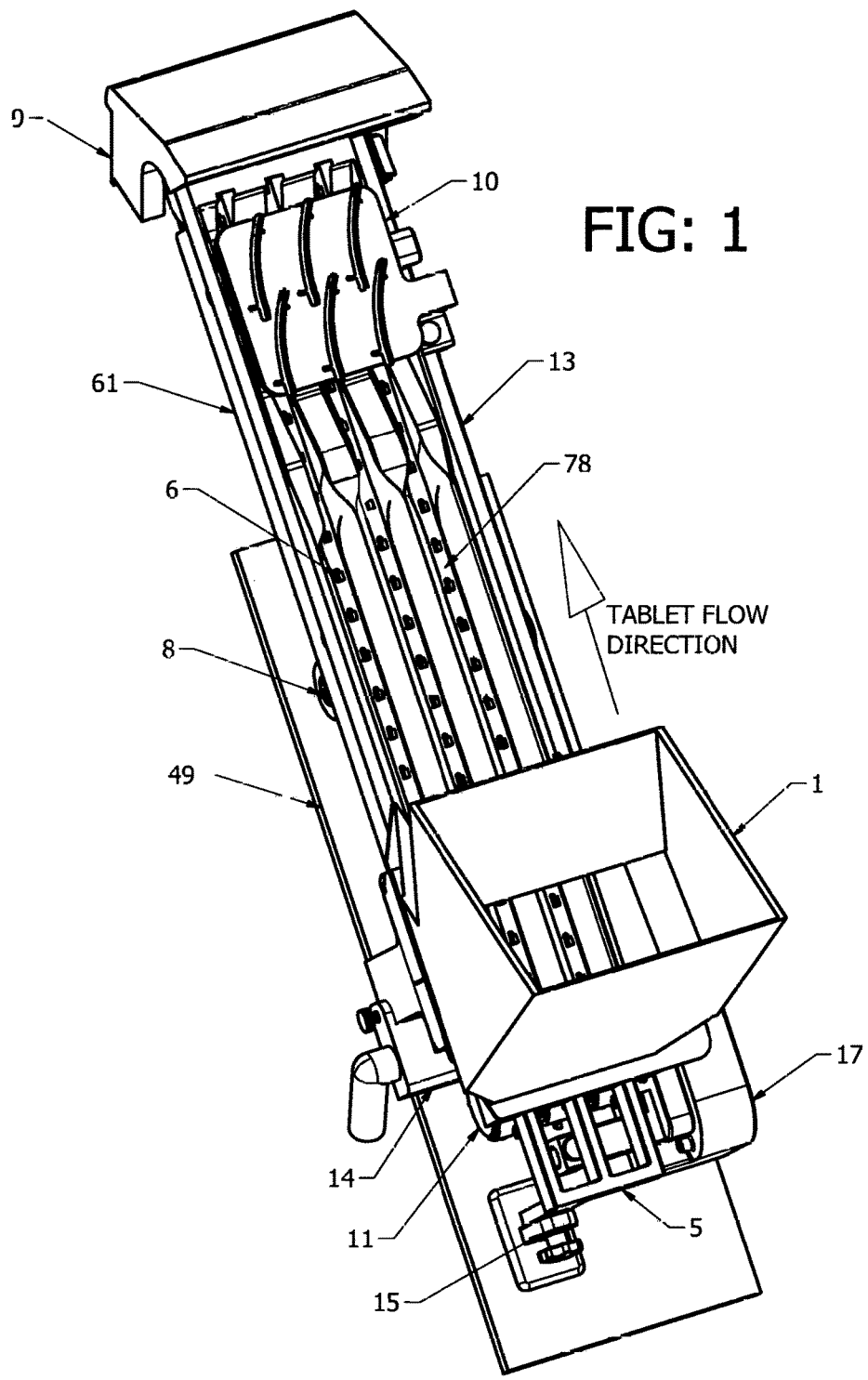
FIG: 1

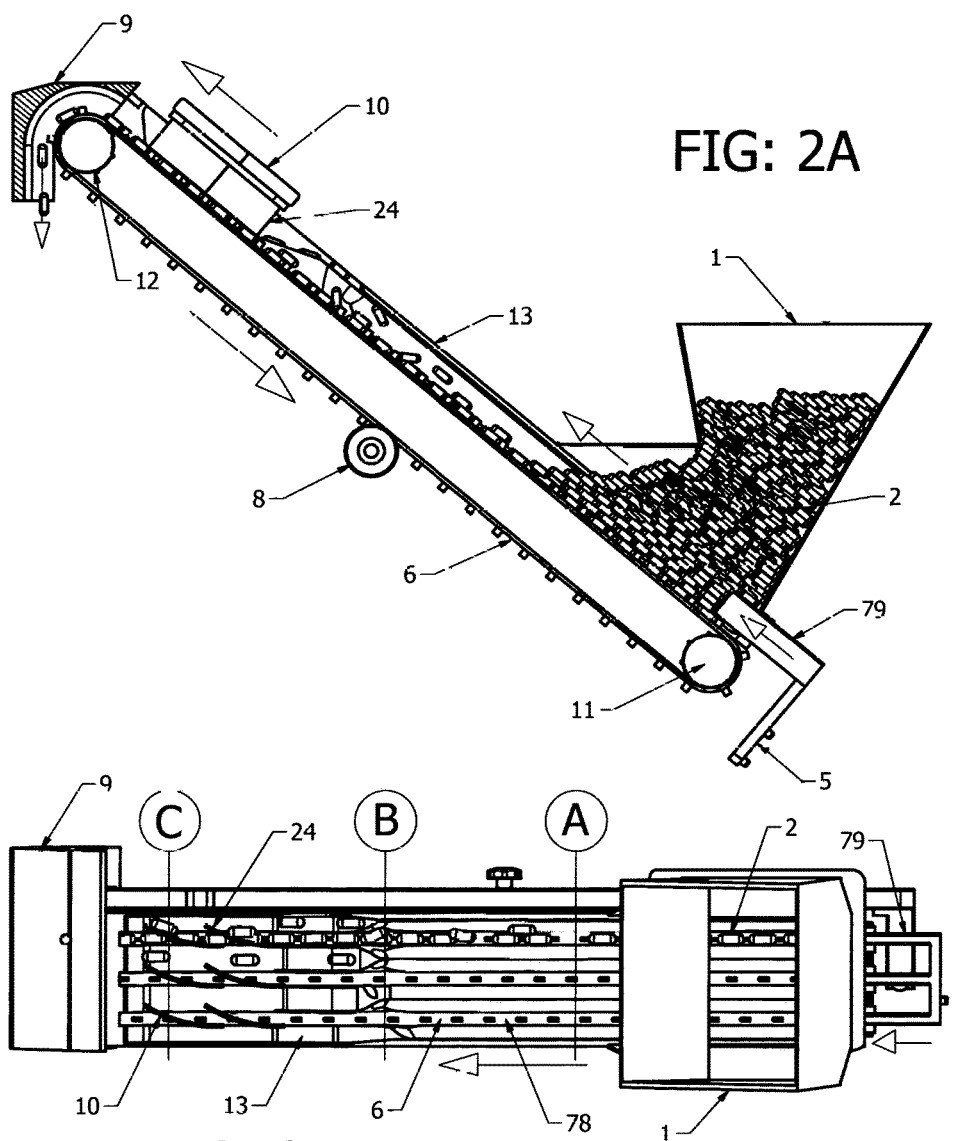

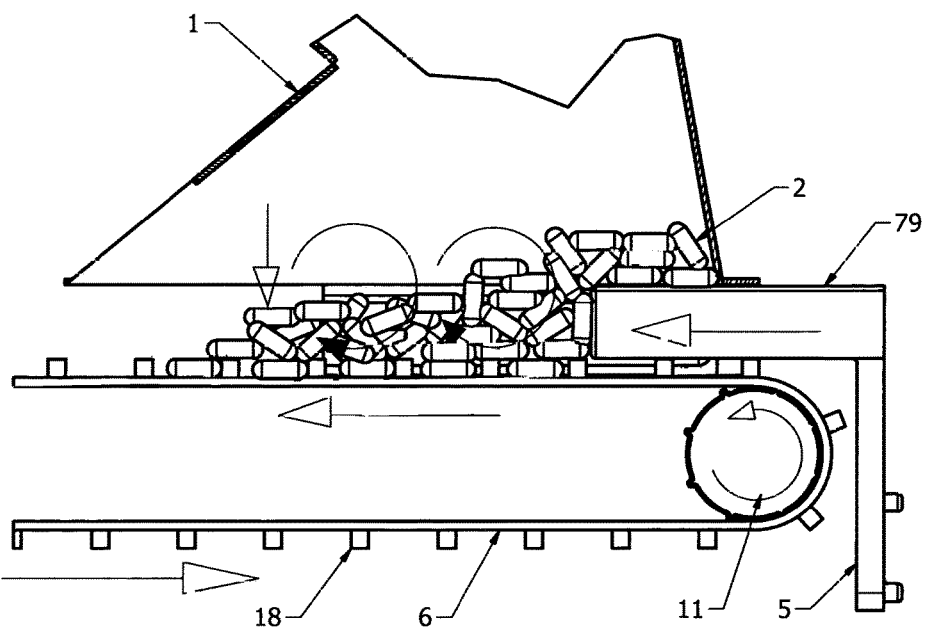
FIG: 2C
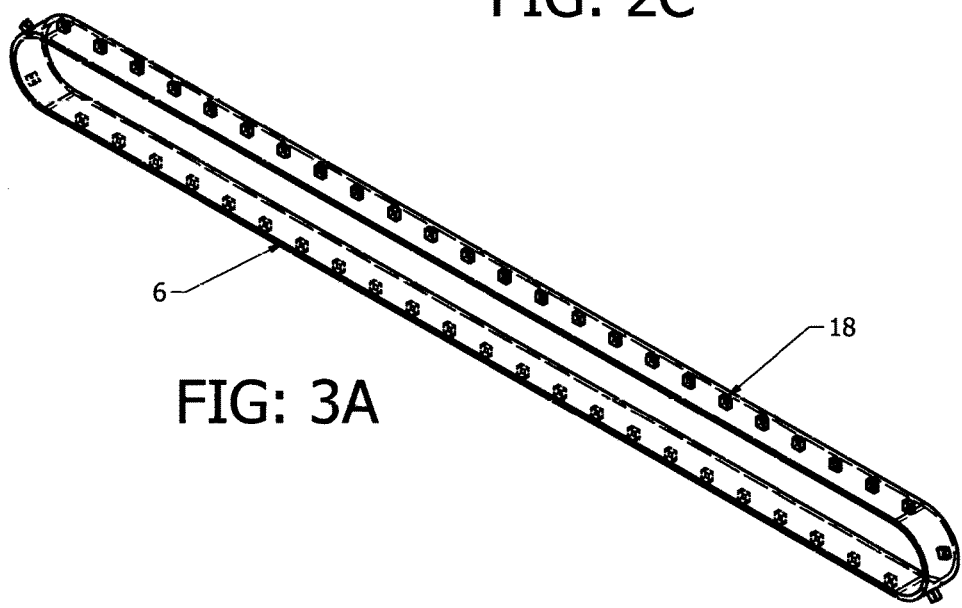
FIG: 3A

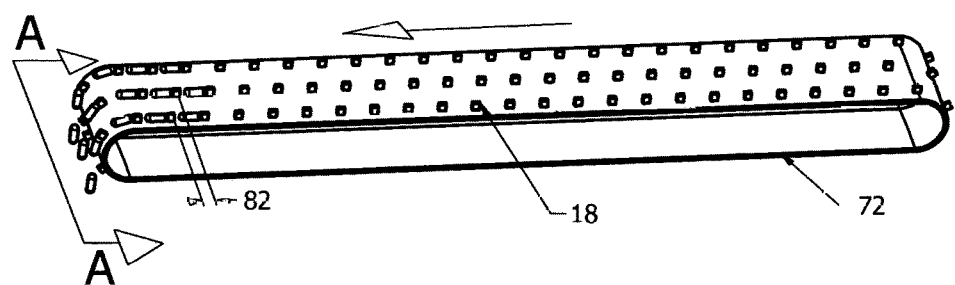
FIG: 3B
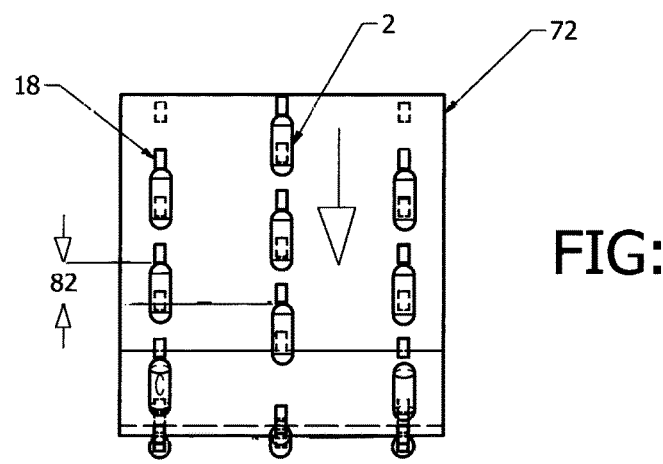
FIG: 3C
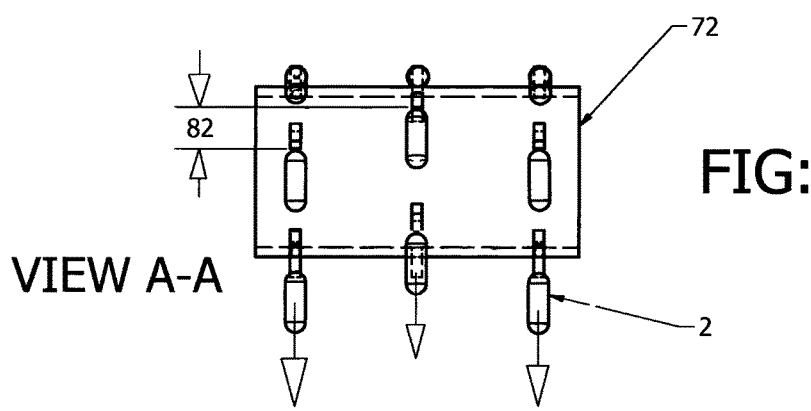
VIEW A-A
FIG: 3D

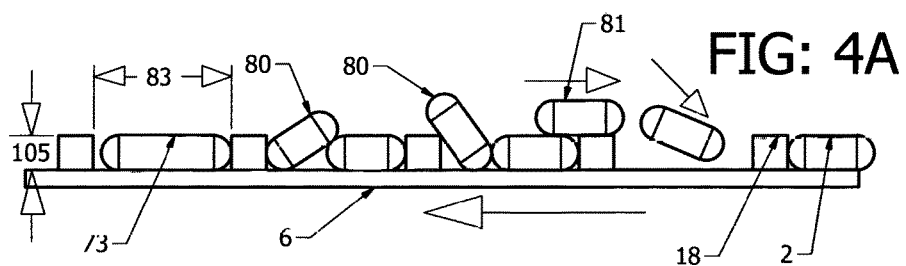
FIG: 4A
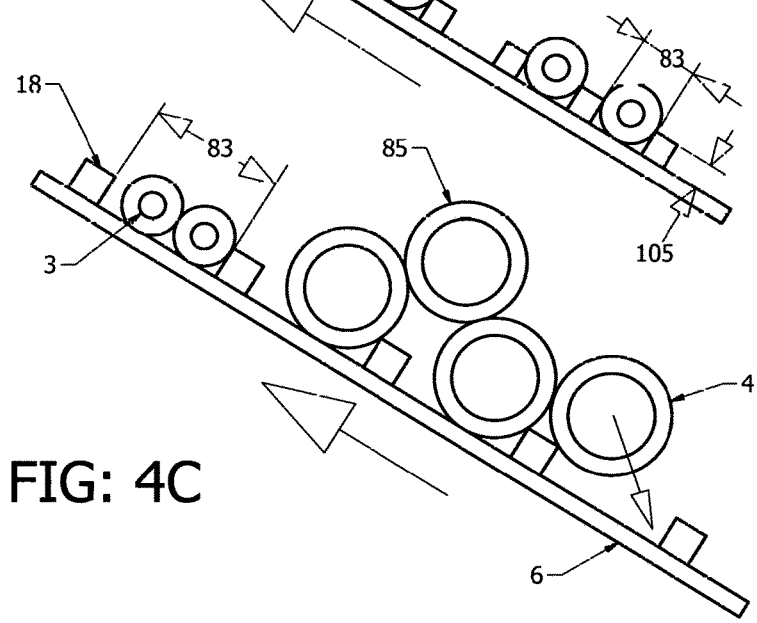
FIG: 4B
FIG: 4C

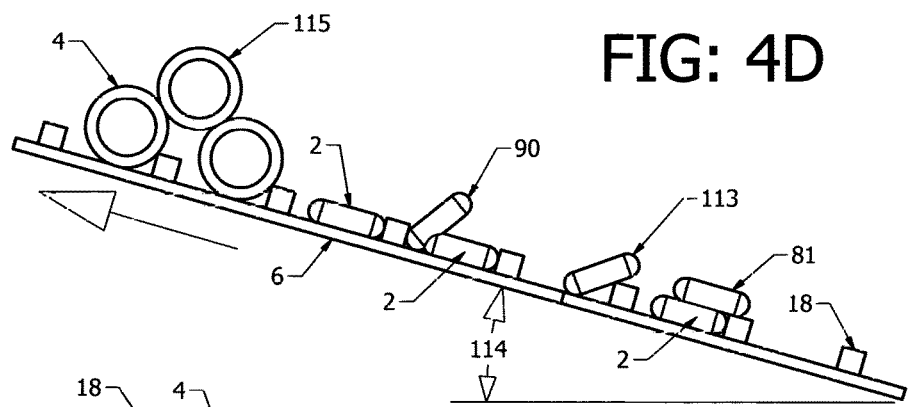
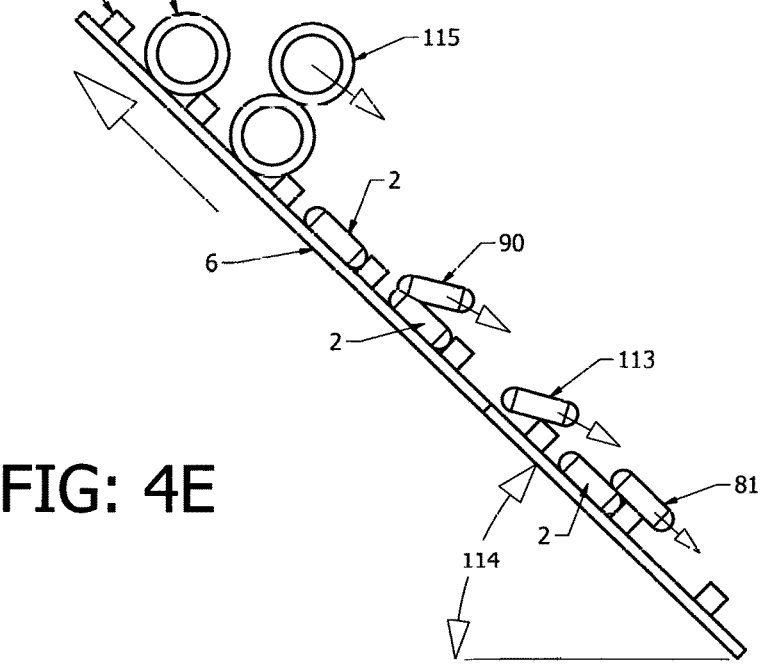

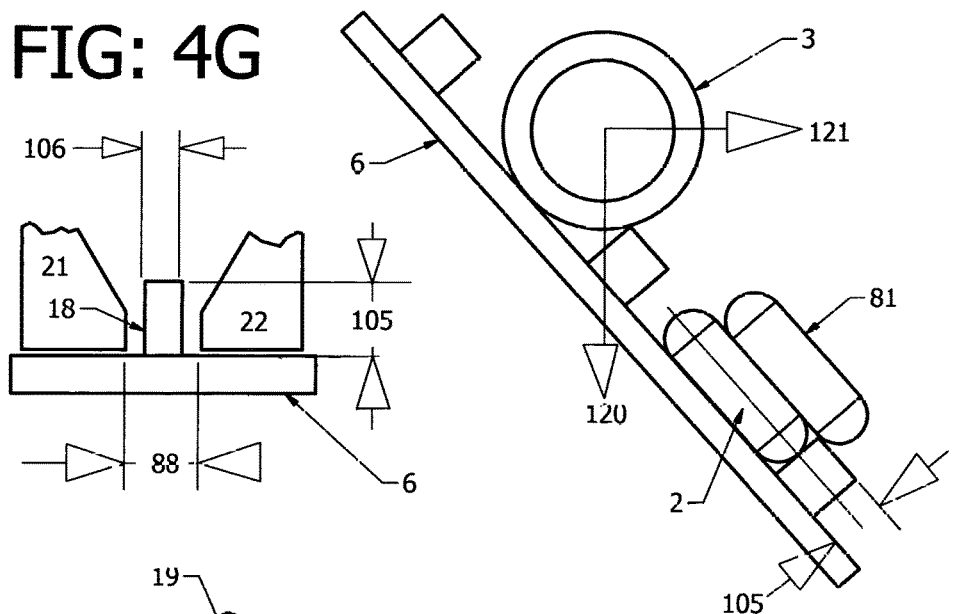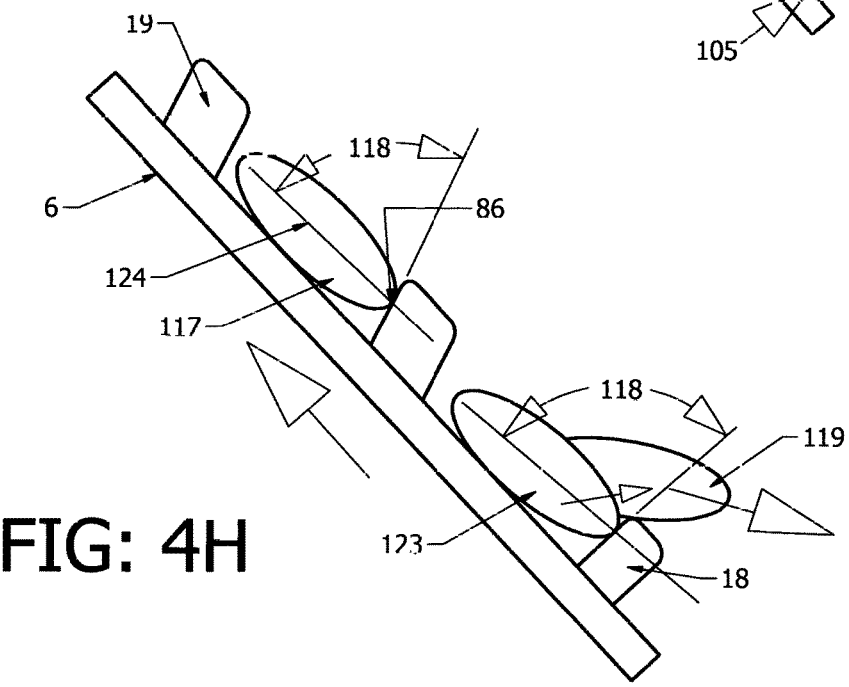

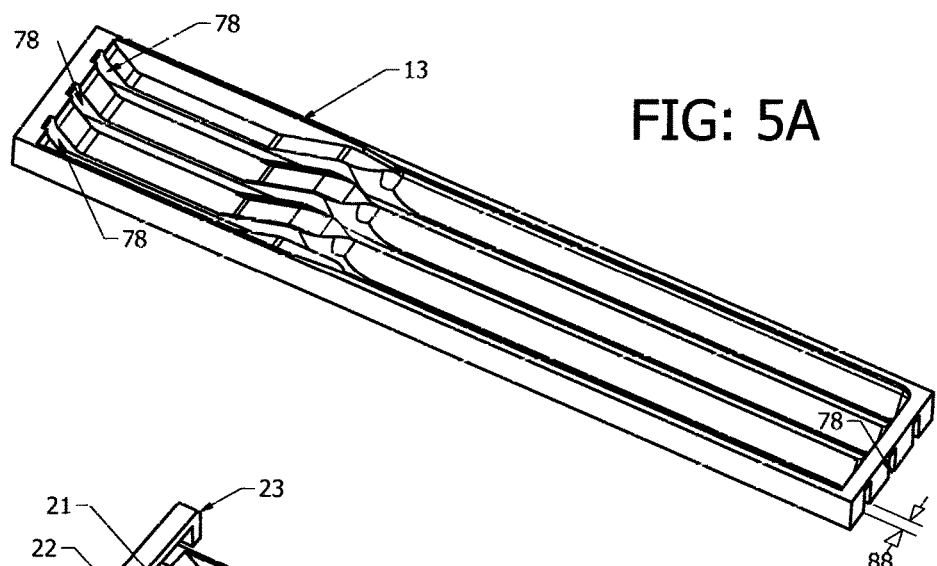
FIG: 5A
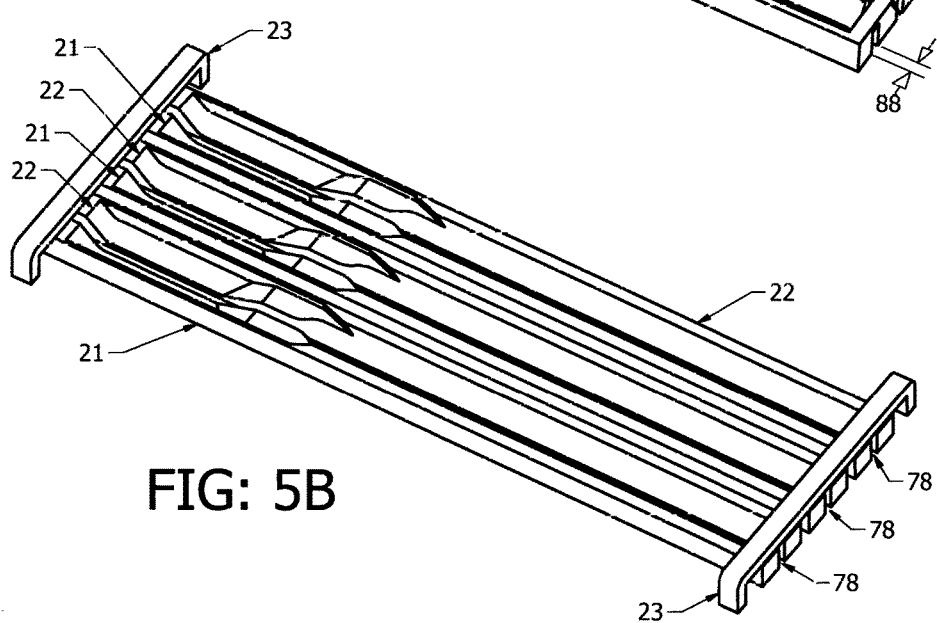
FIG: 5B

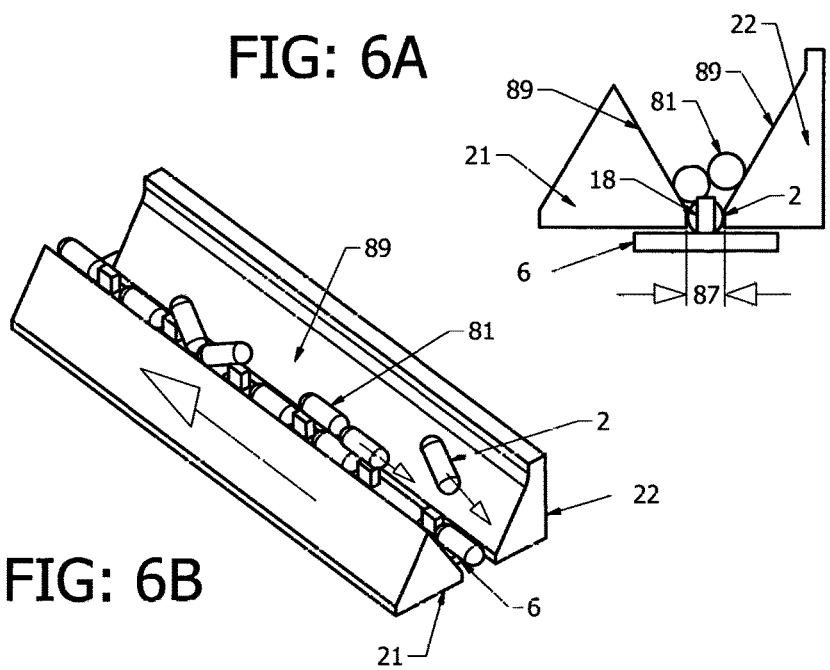
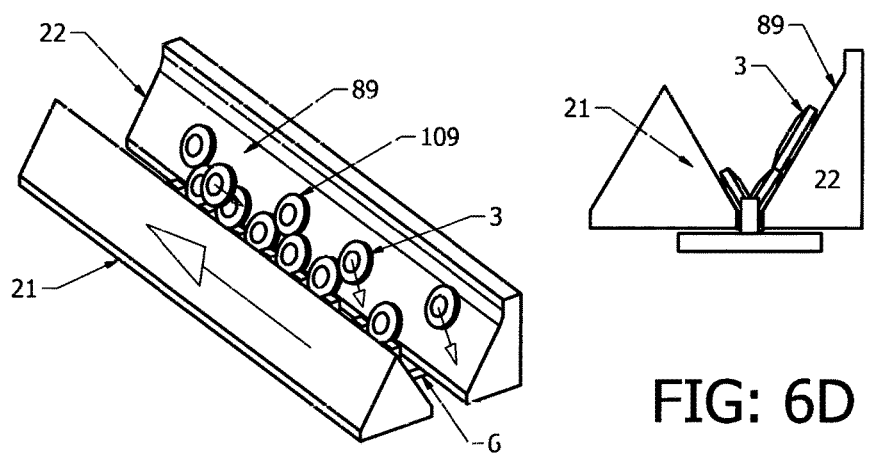

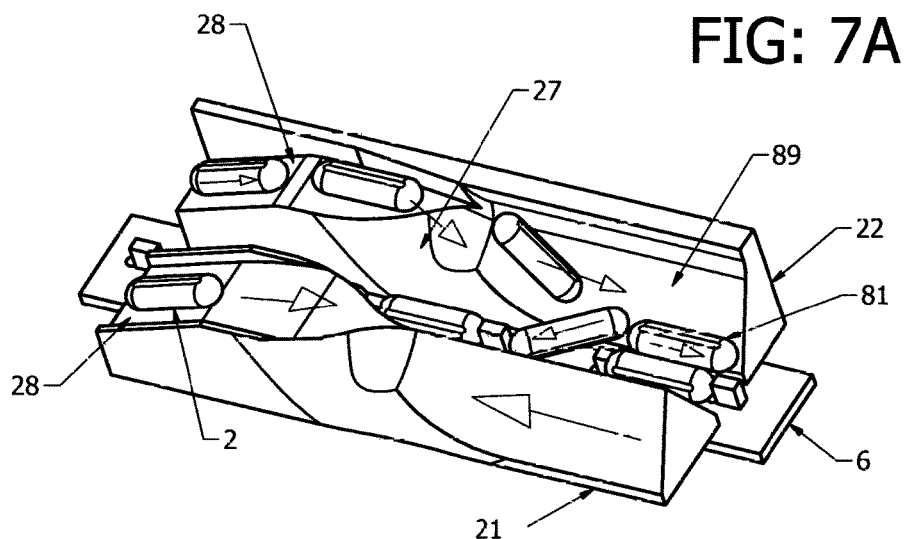
FIG: 7A
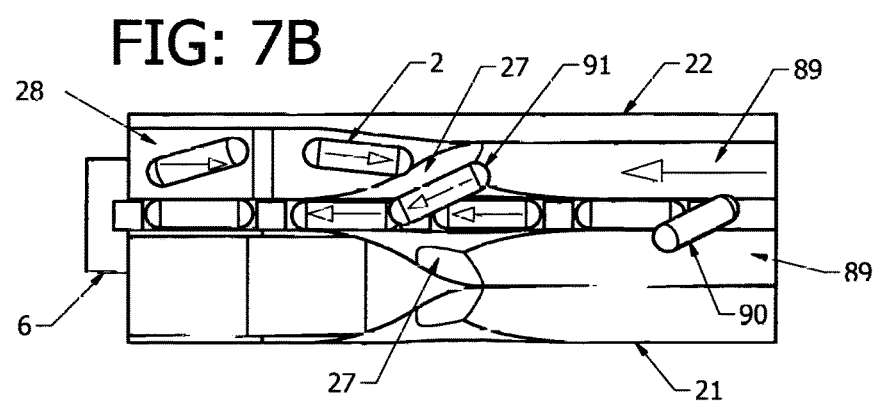
FIG: 7B
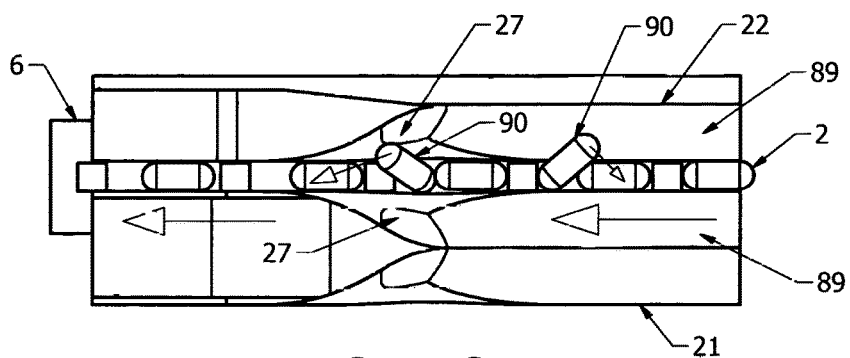
FIG: 7C

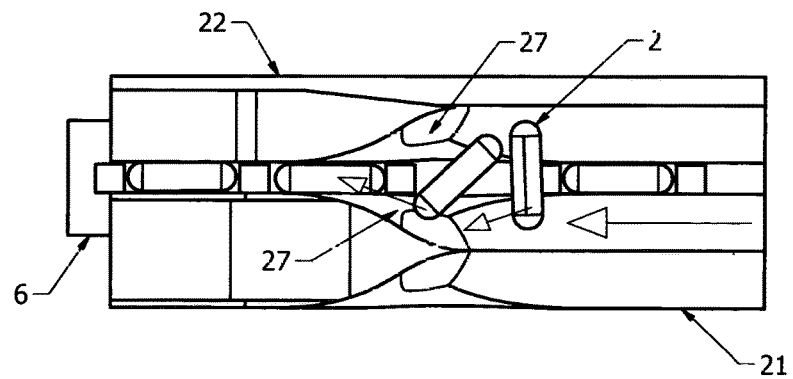
FIG: 7D
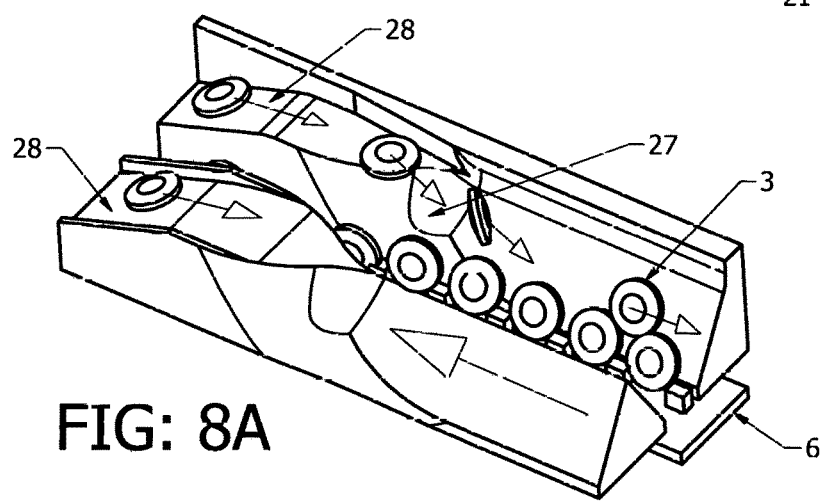
FIG: 8A
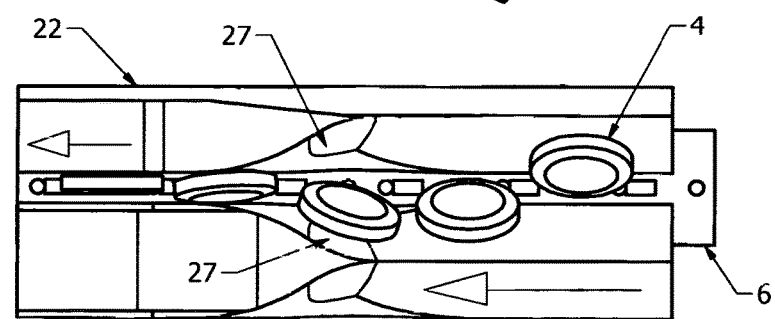
FIG: 8B

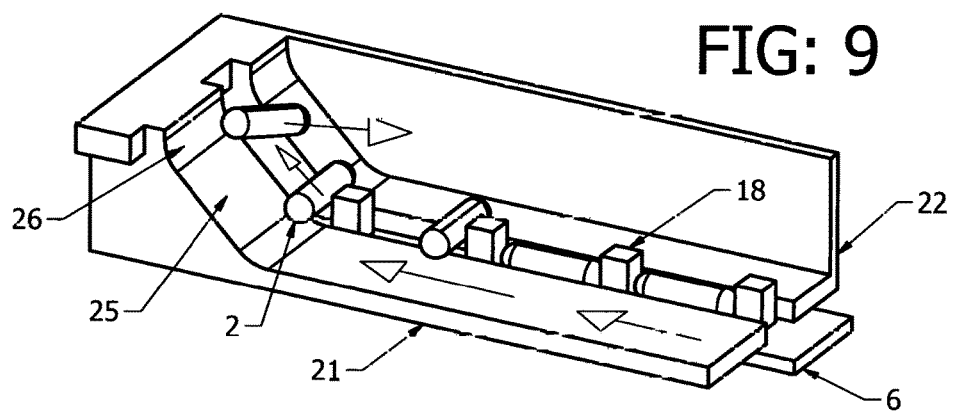
FIG: 9
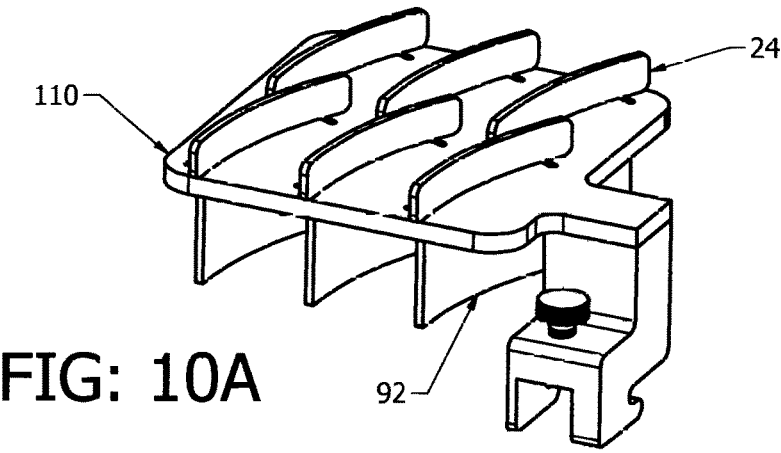
FIG: 10A
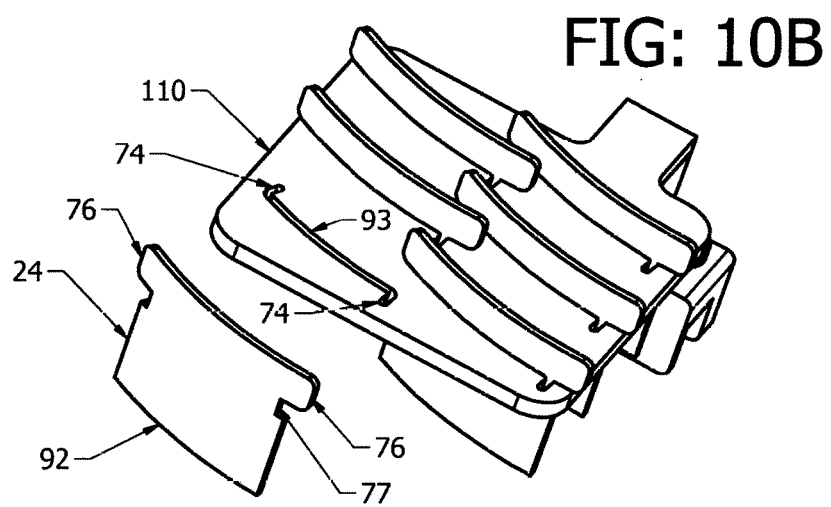
FIG: 10B

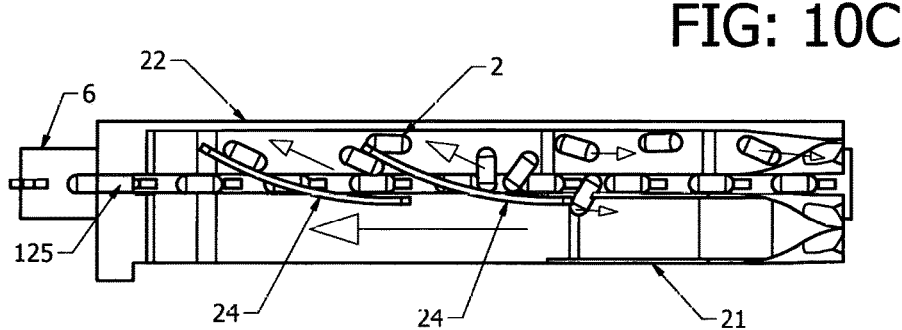
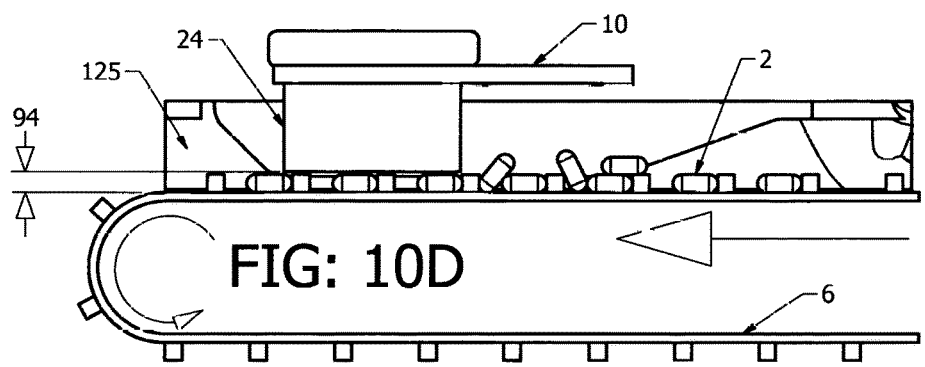
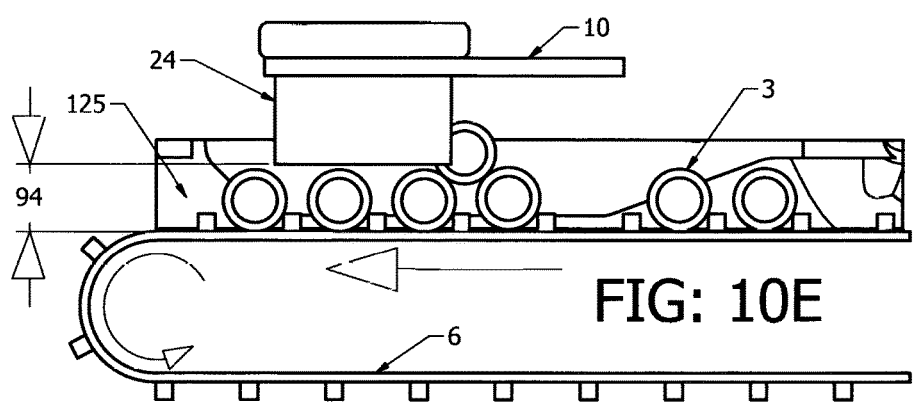

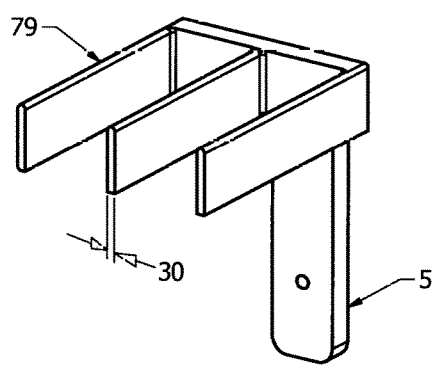
FIG: 11A
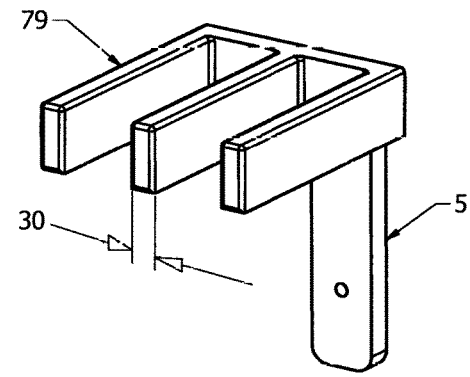
FIG: 11B
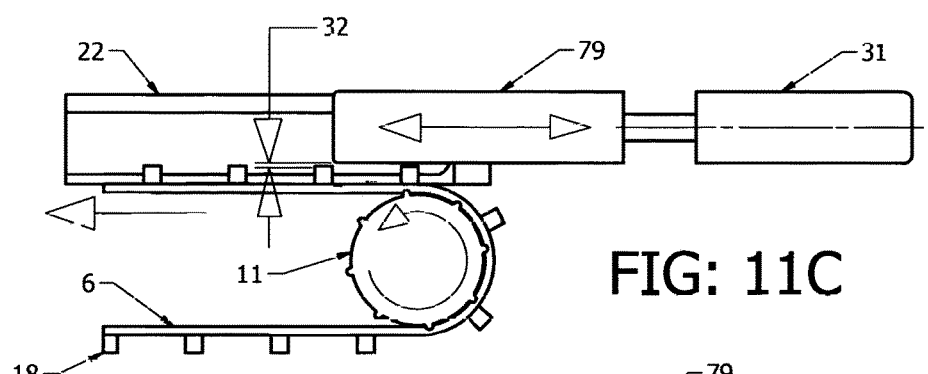
FIG: 11C
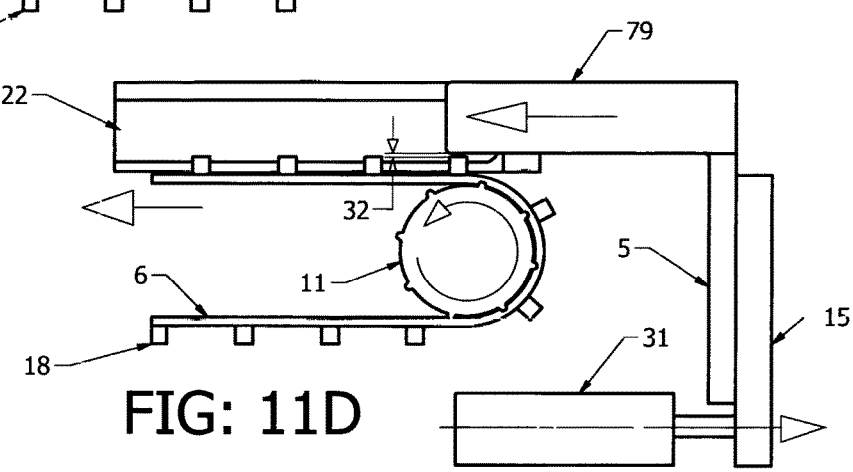
FIG: 11D

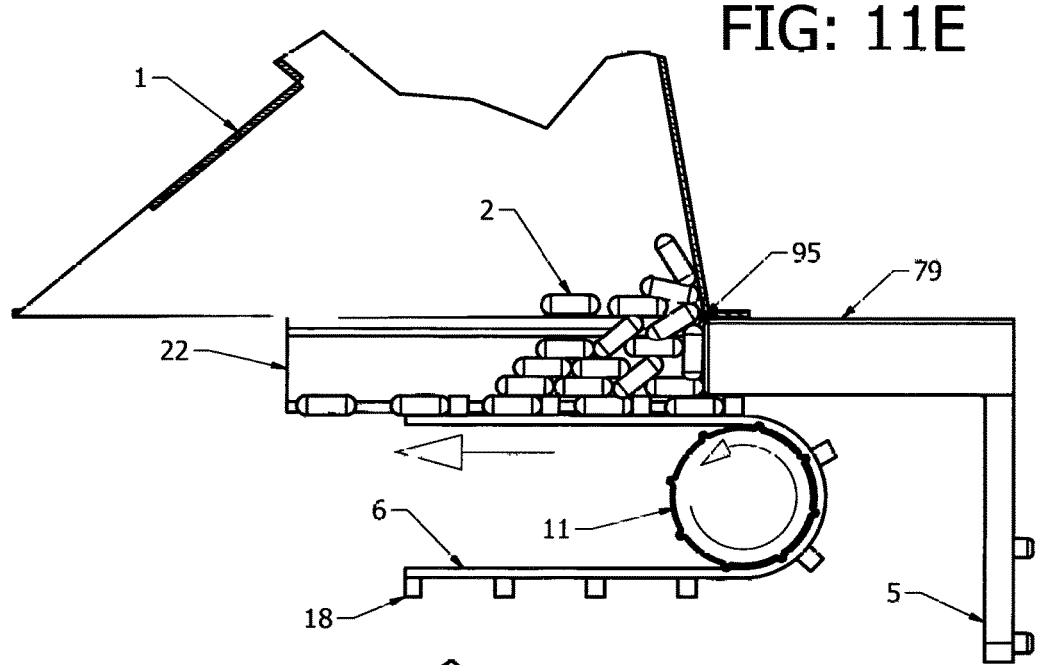
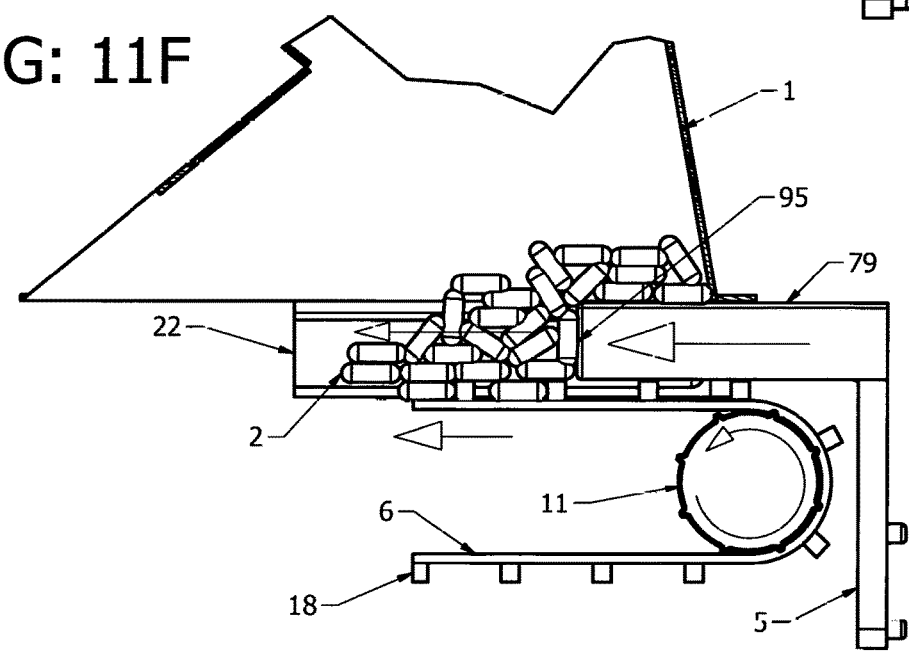

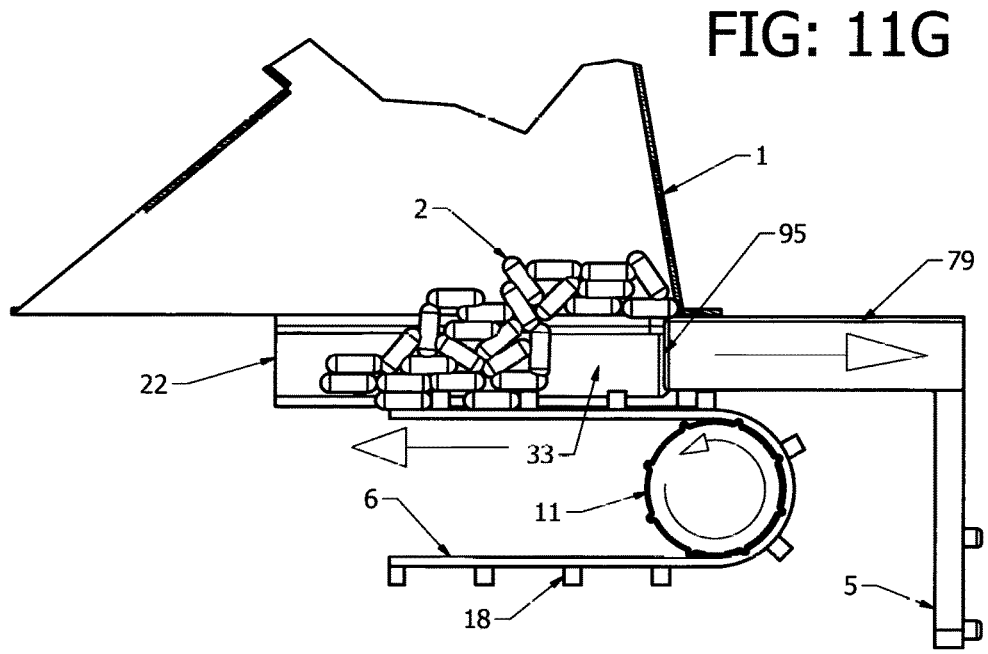
FIG: 11G
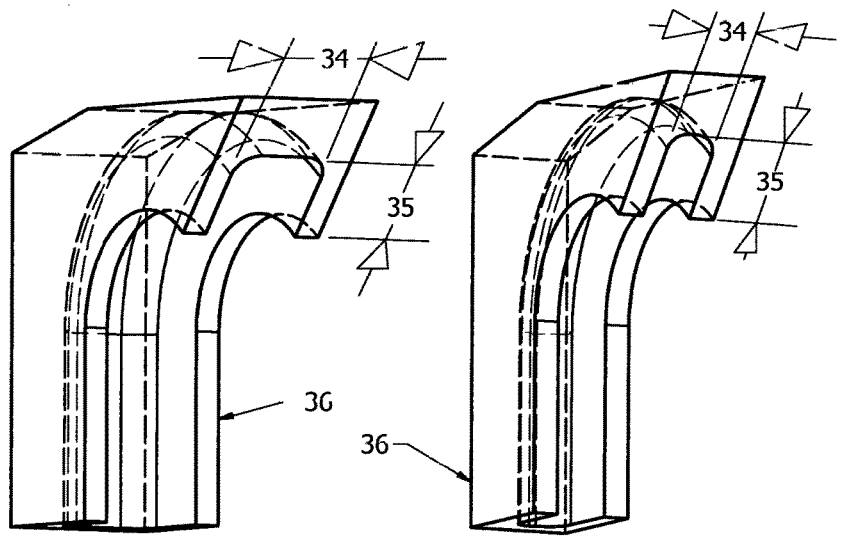
FIG: 12A  FIG: 12B

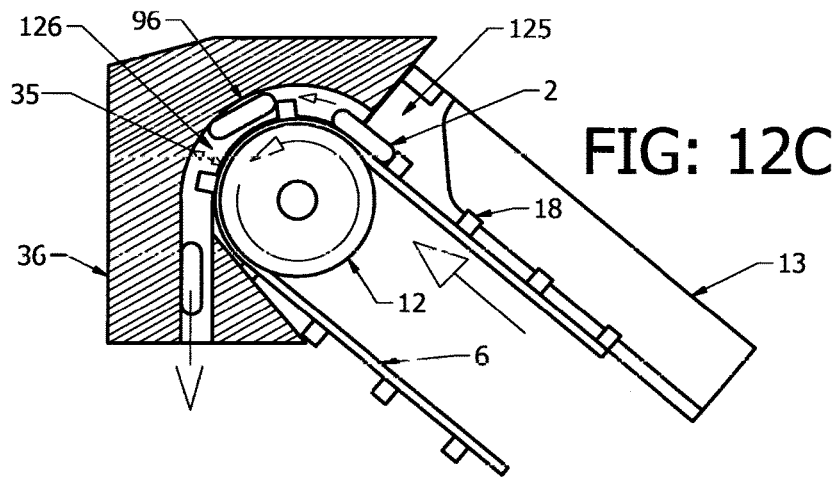
FIG: 12C
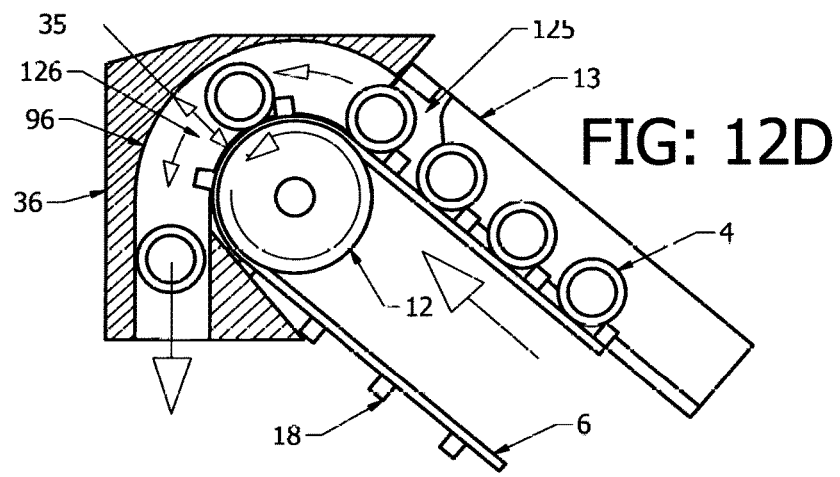
FIG: 12D
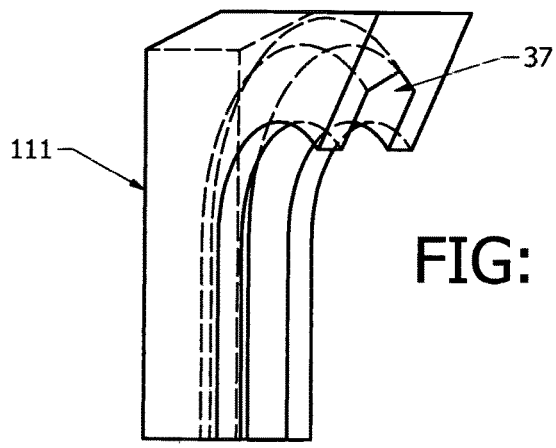
FIG: 13A

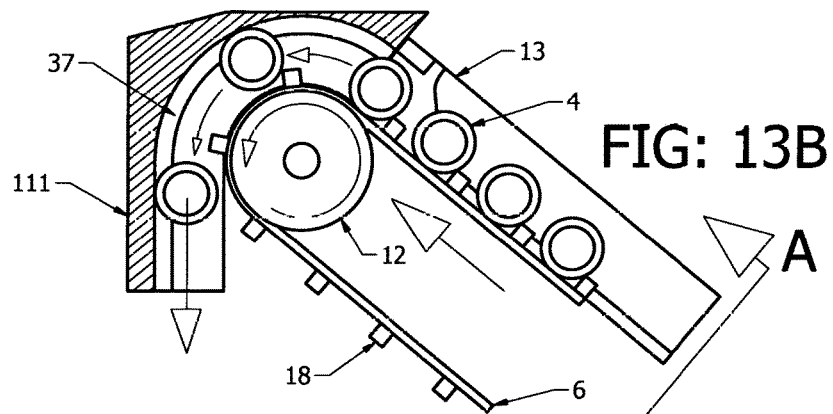
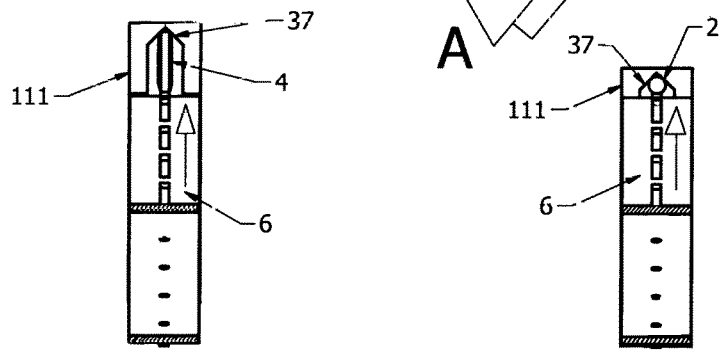
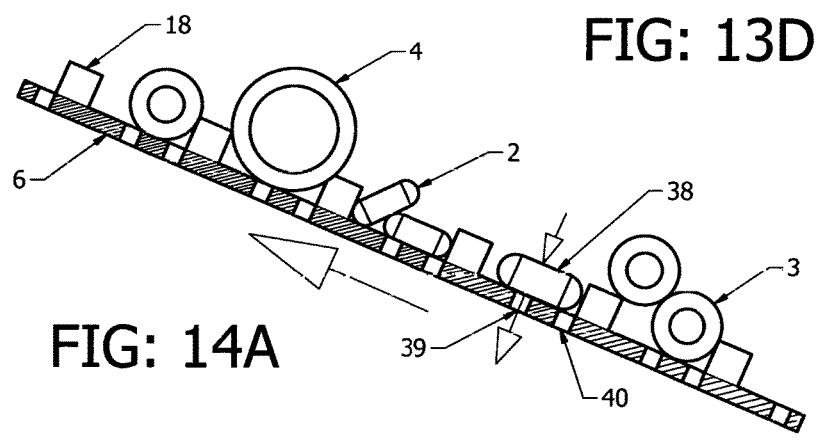

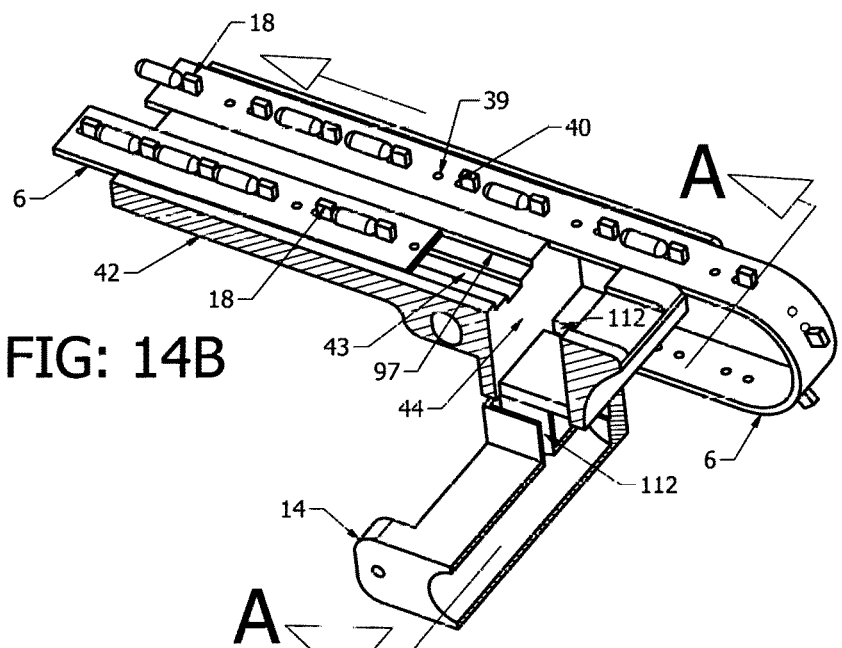
FIG: 14B
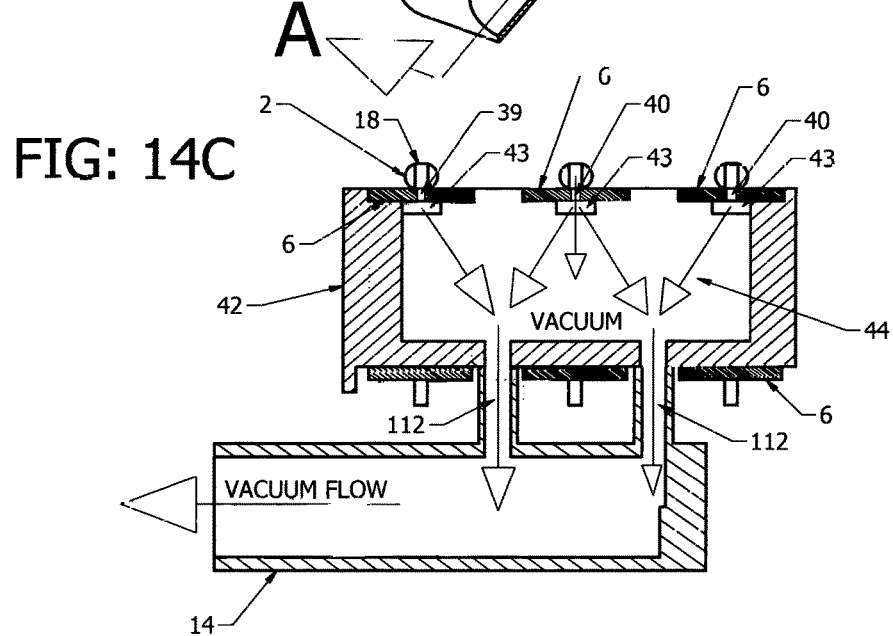
FIG: 14C

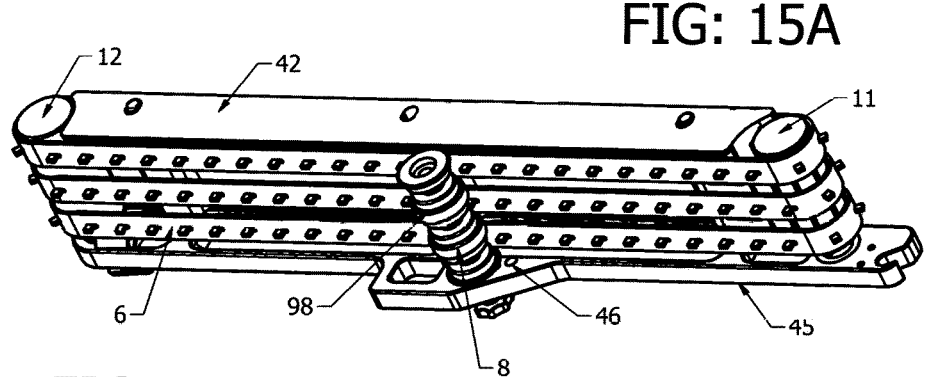
FIG: 15A
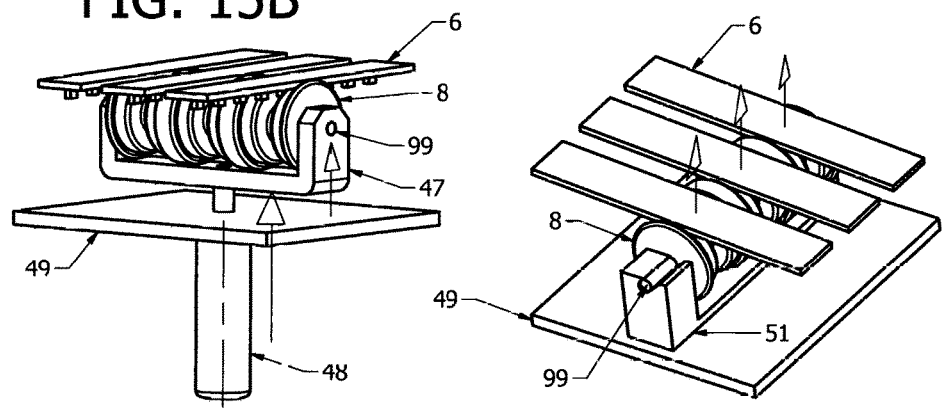
FIG: 15B
FIG: 15C
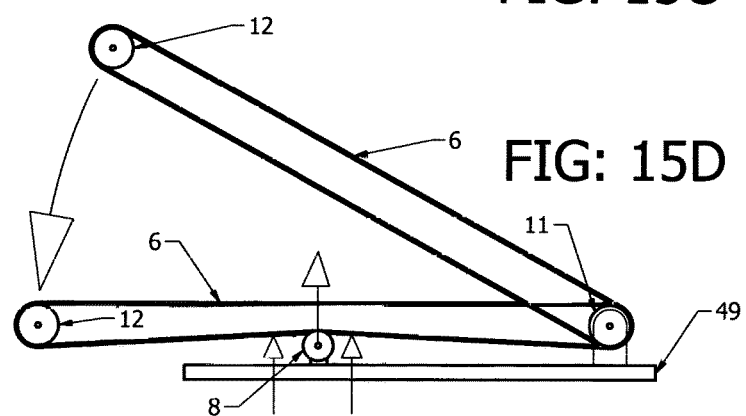
FIG: 15D

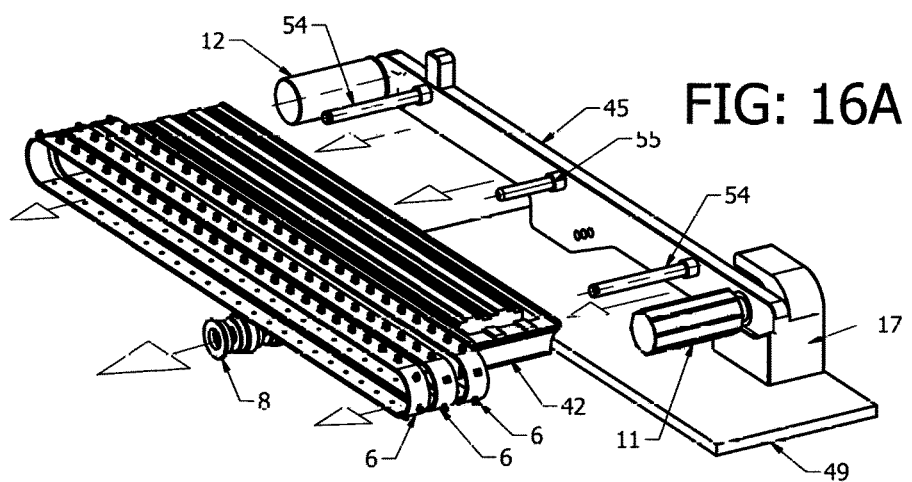
FIG: 16A
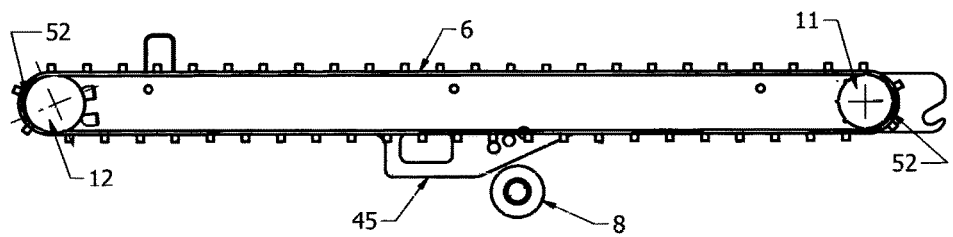
FIG: 16B
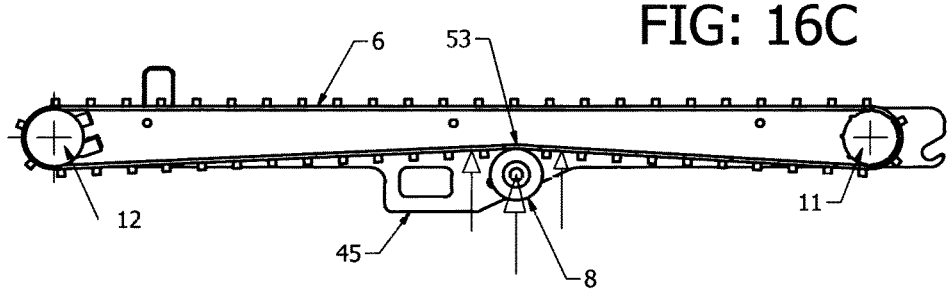
FIG: 16C

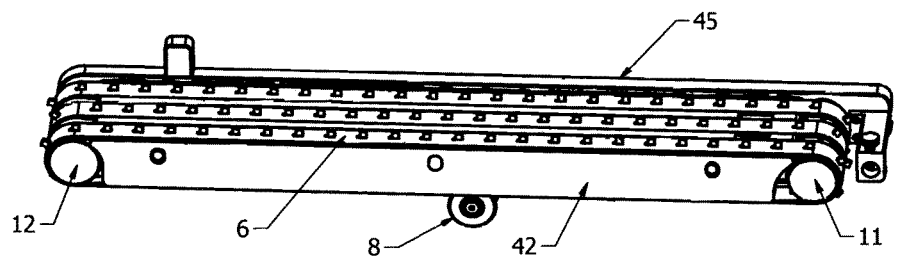
FIG: 17A
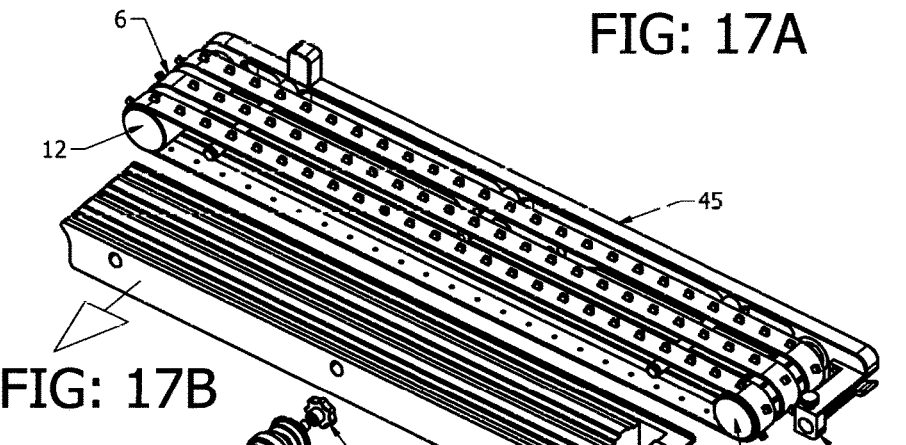
FIG: 17B
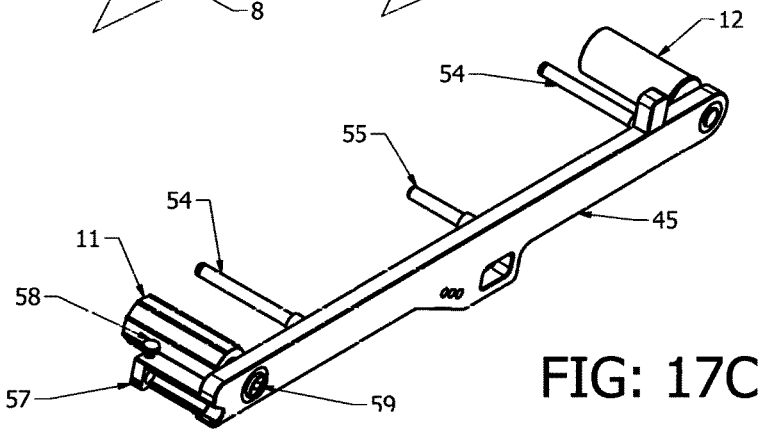
FIG: 17C

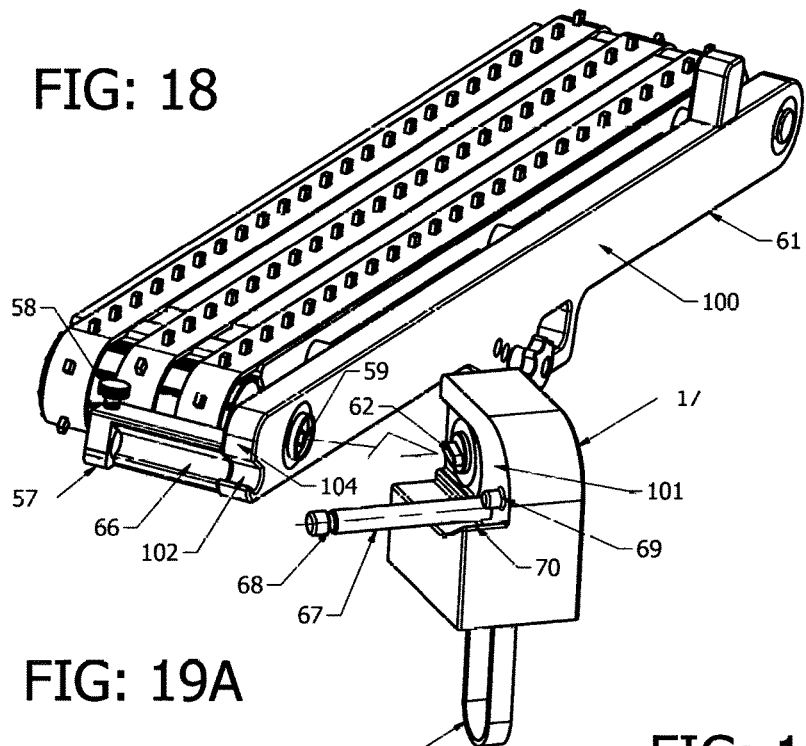
FIG: 18
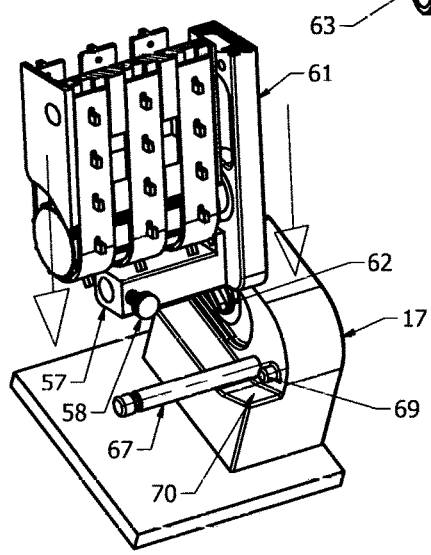
FIG: 19A
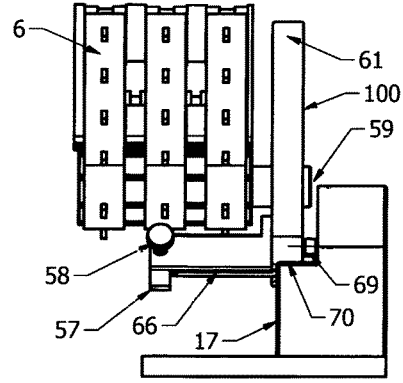
FIG: 19B

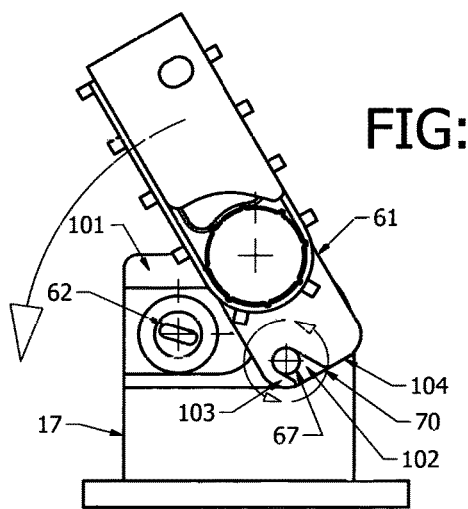
FIG: 19C
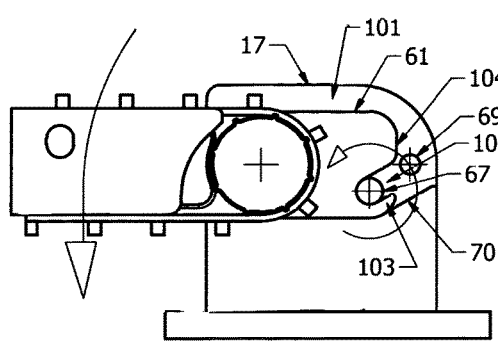
FIG: 19D
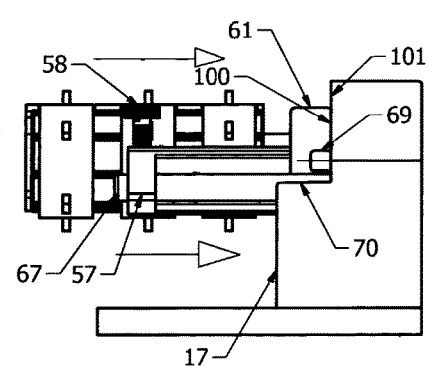
FIG: 19E

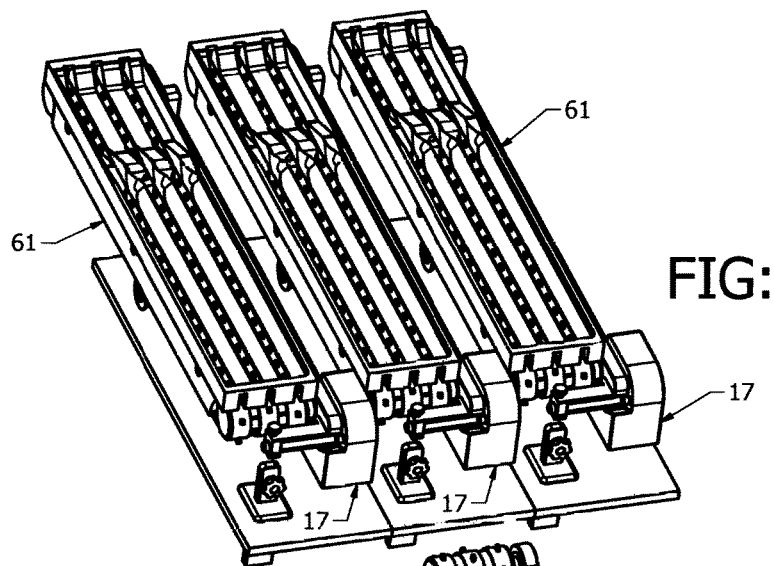
FIG: 19F
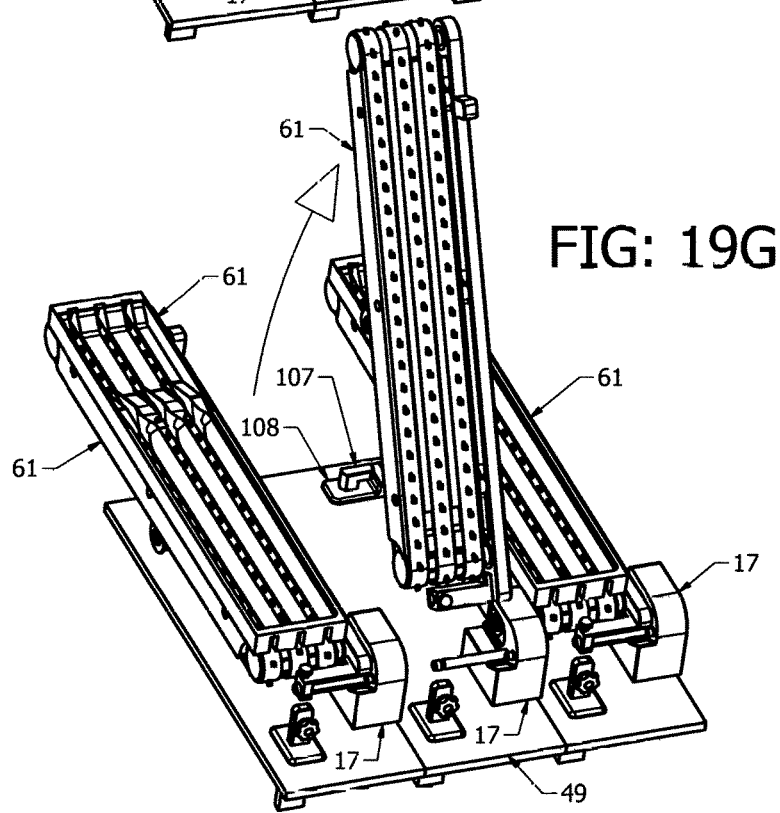
FIG: 19G

BELT SORTING SYSTEM

FIELD OF THE INVENTION

This present invention relates to the feeding, transportation, sorting, spacing and the dispensing of tablets or other small articles by a positively incline conveyor with equally spaced profile cleats. Then discharging them equally spaced over the exit end of its conveyor, downwards pass a counting sensor to a container or catch gates below.

BACKGROUND OF THE INVENTION

There are several different tablet or small article feeding systems commonly used today. They are either large in size, slow in speed, or have feeding systems that are ganged and dependent to each other. The most common tablet or small article feeding systems are Vibratory "V" Chutes and trays; Vibratory Bowls; Fill by weight; Slat counters; Disc Counters; Roller Sorting Systems; Vacuum disc/Drum; Centrifugal Rotating Disc Counters, and the Rotating Dedicated Pocket Disc style.

The two Vibrating Styles of feeders are prone to make a lot of noise. As you increase the feed rate, the noise level increased as well. The vibration can damage the tablets by shaking them at such a high rate, and tend to produce a lot of tablet dust. This type of feeding system is inefficient as much of the energy of the vibrator is in lifting the article up vertically, then moving it forward. As the vibration rate increases, the tablet stability decreases as they start bouncing around uncontrollably.

Weight Counters, count by weight, and are less accurate than others as they cannot tell if a capsule is empty or if a partial tablet was passed. Every batch of tablets have a different amount of humidity, water content, so the tablet weight could vary. Also there are manufacture tablet weight and ingredient tolerances to consider. With the accumulation of all these possible errors, this type of counting is not the most accurate.

The Slat Counter is large and fast, but has many change parts and is difficult and time consuming to change over. Each different tablet size and shape must have dedicated expensive change parts. So this is why this machine is normally dedicated to one or only a few different tablet sizes.

The Disc Counter is large in size and has big dedicated change parts. A set of change parts must be made for each different tablet size and shape in which is expensive and requires a lot of storage space. Normally this style of machine is used for large production runs.

The Centrifugal Rotating Disc Counter, has a hopper in the middle of it and it feeds out tablets onto a horizontal rotating disc. As the disc rotates, the tablets are drawn towards the outer sides due to inertia. Then they exit the disc at its outer edge, and drops down due to gravity pass a count sensor.

This counting system is slow, and the disc is large in diameter, and care has to be given in order to prevent doubling up tablets to exit at the same time.

The Rotating Dedicated Pocket Disc Style counter does feed quickly, but requires a dedicated change part disc for each different tablet size and shape in which can be expensive. Also this type of counting system is large in size, especially if several of these disc are to be used for higher output speeds.

The Roller Sorting System does not space the tablets equally and does not ensure a distance between each article when discharging. The long length of the rollers are necessary in order to try to sort out the tablets in one single row with no doubling up at the discharge. The incline angle downwards towards the exit point causes the tablets to roll or to bunch up together at the exit point. Also it's difficult to stop quickly the flow of tablets due to gravity, inertia, and the tendency for round tablets wanting to keep rolling forward.

The Vacuum rotary Disc or Drum counter depends on obtaining a good positive vacuum. Tablets are sucked to the rotary disc or drum style and rotated around then dropped in front of a count sensor. These systems require a lot of air flow, vacuum, in which is noisy and expensive to produce. The vacuum levels is dependent, and could change, depending on how many tablets are covering the holes. Special dedicated change parts are required for the vacuum pockets on the vacuum discs. Also the size of the vacuum hole depends on the weight, feeding speed and size of each tablet.

One big concern today is the overall size of the machine. The industry is asking for machines that occupy less conveyor space and shorter in length in order to utilize there plant space more efficiently. Also the height of the machines are important as some people are shorter than others, and many times these machines require a step or staircase in order to fill the product hopper or to view the tablet sorting process.

Presently most tablet or small article counting machines are designed and built to one size. If you would like to increase production, you must purchase a new machine and place it beside the other one. There is no prevision for machine expansion. This is both very expensive, and could double your present conveyor space requirement and machine foot print.

The industry is trying to get away from using air, vacuum and vibration for tablet feeding due to the noise and dust that they produce, and the energy required. The industry is moving towards less and smaller dedicated change parts, to lower their costs and to improve change over times.

Most companies would like to keep growing in size and later increase their output from their existing counters. Instead of purchasing an entire new machine, many would rather purchase just the counting expansion modules necessary to add onto to their existing machine.

Also during production, if one article feeding lane or count sensor should fail, ideally it would be a benefit to continue with the production run by just closing down that one particular lane and not the entire machine. This is not true for most of these machines listed above.

All of these different counting machines are either large in size; have expensive change parts; run at slow speeds; not expandable or produce a lot of dust and noise. This is why this Belt Sorter System was designed to solve all these issues and concerns.

BRIEF SUMMARY OF THE INVENTION

Accordingly, the aforementioned problems and difficulties are obviated by the present invention. This high speed Belt Sorter System is short in length; it self feeds product from its product hopper, and sorts, space and separated the tablets into one single line on an upward slope. The product is then guided around the top exit guide of the conveyor downwards pass a counting sensor then to the product catch gates below. This invention has a low level cleated conveyor and product hopper height, and occupies a small foot print. This conveyor system is stackable for increase production rates. The cleated conveyor belt is a change part and can be used for many different tablet sizes and shapes. There are no vibrators, vacuum or air required, thus making this feeding system quiet, simple and inexpensive to operate. This dedicated conveyor has its individual speed control, so if several of these feed belt systems were stacked together, any one module could be shut down for maintenance issues and the remaining would continue to operate. Also each Belt Sorting System speed, start and stopping actions are individual and separate, unlike most other feeding systems. This Belt Sorting System is adjustable for different product widths, lengths and heights. Also these cleated belts would have holes in them, just in front of each cleat profile to allow for any dust to be removed by gravity or with the use of an optional vacuum system. Also these holes with vacuum are used to help suck the tablets to the belt for even greater stability.

Therefore it's among the primary objectives of this invention to provide an equally spaced single row of tablets, at a fix feed rate, pass a count sensor to a container or product catch gates below.

A second object of this invention is to have an equally spaced cleated belt conveyor, on a vertical incline as desired. This angle could be adjusted or fixed to suite the best product/cleat profile combination.

A third objective of the present invention is to have adjustable or fixed side guides to open and close along the center line of the cleated belt. These guided are used to form a physical pocket for each different product size and shape.

Another objective is for these side guides to help direct the flow of product from the hopper into the cleated pockets. Also to align the product into one straight row, and to discharge back towards the product hopper any double or stacked tablets. Also to vertically align the articles before discharging them over the exit guide at the end of the conveyor.

A fifth objective is to use a tablet push bar to dislodge any jammed articles at the bottom of the product hopper. This also creates a stirring action in help placing the product into the cleated pockets of the cleated conveyor.

Still another objective is for this cleated conveyor assembly to be quickly removable for cleaning, and for its motor drive to be built inside of the machine frame.

A seventh objective is to control and to guide the exiting tablets from the exit end of the cleated conveyor around its center axis straight downwards in a straight line equally spaced pass a count sensor.

A eighth objective is the ability to have a cleated belt with one or more rows of cleat profiles parallel and equally spaced to each other, with each row of cleats either being in line with each other or offset to assist with the counting spacing and accuracy.

A ninth objective is the option of leaving the cleated conveyor assembly fix to the machine, and to have just the cleated belt and its contact parts removable for cleaning.

Another objective is to have an adjustable height tablet deflector assembly with removable deflector paddles to help remove any doubled up tablets.

An eleventh objective is to be able to remove one or more cleated conveyor modules without moving or sliding any others, and to have the machine still capable to continue to operate.

Still another objective is to have holes in the cleated belt and to use a vacuum source to remove the dust from the belt, and to help suck the tablets to the belt.

A thirteen objective is to be able to change the positive belt incline angle to better reject doubled up tablets.

Another objective is to have different belt cleat profiles to suite different tablet widths and lengths. Also different shaped cleats with sloped faces for better feeding performance.

Still another objective is the longer the length of the cleat profile, the greater the space between each tablet.

A last objective is to be able to stack several of these cleat conveyor modules together, to increase the total machine product output rate.

BRIEF DESCRIPTION OF THE DRAWINGS

The features of the present invention which are believed to be novel are set forth with particularity in the appended claims. The present invention, with respect to its organization and manner of operation, together with further objects and advantages thereof, may best be understood by reference to the following description, taken in connection with the accompanying drawings in which:

FIG. 1 is a top-side isometric view of the invention.

FIG. 2A is a side cross section view of the invention showing the tablet flow.

FIG. 2B is a top view showing the tablet flow of the invention.

FIG. 2C is a cross section view of the tablet circulation with in the product hopper.

FIG. 3A shows an isometric view of a single row cleated belt.

FIG. 3B shows an isometric view of a triple row cleated belt, with offset teeth.

FIG. 3C shows the top view of view A-A in FIG. 3B, showing the cleat/tablet offset spacing.

FIG. 3D is the view A-A of FIG. 3B showing the offset tablet spacing.

FIG. 4A shows a side view of a cleated belt with capsule shape tablets on it.

FIG. 4B shows a side view of a cleated belt with round tablets on it.

FIG. 4C is a side view of a cleated belt showing how different diameter round tablets fit with in the cleats.

FIG. 4D shows a side view of a low incline cleated belt with round and capsule shaped tablets on it.

FIG. 4E is the same view as FIG. 4D, but having the cleated belt at a high incline angle.

FIG. 4F is a side view of a high incline cleated belt, with capsules and a round tablet on it, showing the cleat height and geometry.

FIG. 4G is a typical end view of the cleated belt and its side guides, showing the cleat height and width.

FIG. 4H shows a side view of a high incline slope and straight profile cleated belt with football shaped tablets on it.

FIG. 5A is an isometric view of a triple lane tablet guide block.

FIG. 5B shows an isometric view of an adjustable three lane tablet guide system.

FIG. 6A is the end view of FIG. 6B.

FIG. 6B is an isometric view of FIG. 2B, view "A".

FIG. 6C is the same view of FIG. 6B, but showing round shape tablets.

FIG. 6D is the end view of FIG. 6C.

FIG. 7A shows an isometric view of FIG. 2B, view "B".

FIG. 7B is a top view of FIG. 2B, view "B" showing how a piggyback capsule shape tablet moves into a linear position.

FIG. 7C is another top view of FIG. 2B, view "B", showing how a sloped sideways capsule tablet gels guided into a linear position.

FIG. 7D is a top view of FIG. 2B, view "B", showing how a sideways capsule tablet rotates to a linear position.

FIG. 8A shows an isometric view of FIG. 2B, view "B", but with round tablets.

FIG. 8B is a top view of FIG. 2B, view "B", showing how these round tablets align linear to the belt cleat path.

FIG. 9 is an isometric view of FIG. 2B, view "C", showing how a tablet cannot be jammed between the belt cleat and the tablet exit point.

FIG. 10A is an isometric view of the tablet deflector assembly.

FIG. 10B shows an isometric view of how a tablet deflector paddle is removed from tablet deflector assembly.

FIG. 10C is a top view of FIG. 2B, view "C", showing how the double tablets are guided to the side by the tablet deflectors.

FIG. 10D is a side view of FIG. 10C.

FIG. 10E is a side view of FIG. 10C but with showing round tablets.

FIG. 11A is an isometric view of a triple lane tablet pusher used for thin width profile tablets.

FIG. 11B is an isometric view of a triple lane tablet pusher used for wide width profile tablets.

FIG. 11C is a side view of the tablet pusher orientation with an air cylinder pushing it back and forth along the centerline of the cleated belt.

FIG. 11D is the same view of FIG. 11C, showing another position of the air cylinder mounted from below the cleated belt.

FIG. 11E is a section view of the product hopper and the tablet pusher in its retracted position.

FIG. 11F is the same view of FIG. 11E, with the tablet pusher in the forward, pushing extended position.

FIG. 11G is the same view of FIG. 11E, with the tablet pusher retuned back to its retracted position, showing the empty pocket that the tablet pusher had created.

FIG. 12A is an isometric view of a replaceable tablet exit guide with a wide channel profile.

FIG. 12B is an isometric view of a replaceable tablet exit guide with a narrow width channel profile.

FIG. 12C is a cutaway view of the tablet exit guide with the cleated belt, showing the tablet flow of capsule tablets exiting.

FIG. 12D is the same view of FIG. 12C with showing large diameters round tablets.

FIG. 13A is an isometric view of a replaceable tablet exit guide incorporating a tablet top centering groove in it.

FIG. 13B is the same view as FIG. 12C but with showing the replaceable tablet exit guide with a tablet top centering groove in it.

FIG. 13C is view "A" of FIG. 13B.

FIG. 13D is view "A" of FIG. 13B, but showing it with a capsule shaped tablet.

FIG. 14A is a cross-section side view showing different types of tablets on a vacuum tooth belt.

FIG. 14B is an isometric, cutaway view of a belt assembly, showing how the vacuum belt system functions.

FIG. 14C is a section view "A" of FIG. 14B showing the vacuum flow.

FIG. 15A is a bottom isometric view of the removable belt assembly showing the adjustable belt tensioner roller.

FIG. 15B shows an isometric view of a base mounted air cylinder belt tensioning roller.

FIG. 15C is a top isometric view of a fixed belt tensioning roller system, where the belt assemble is lowered on top of it, as shown in FIG. 15D.

FIG. 15D is a side view of how the fix belt tensioning system as seen in FIG. 15C functions.

FIG. 16A is an isometric exploded view showing the removal of the change parts of a fixed mounted belt system.

FIG. 16B is a side view of FIG. 16A with the cleated belt loose over the rollers, without the tensioner roller in place.

FIG. 16C is a side view of FIG. 16A with the belt tensioning roller engaged, tightening the belt around the two end rollers.

FIG. 17A is a top isometric view of the removable belt assembly.

FIG. 17B is an exploded isometric view of FIG. 17A, showing the removal of the change parts of the removable belt assembly.

FIG. 17C is the back side isometric view of FIG. 17A with all of its removable change parts off of it.

FIG. 18 is a back isometric view of the removable belt assembly showing how its drive coupling attaches to the coupling on the drive housing assembly.

FIG. 19A is an isometric cutaway end view of the removable belt assembly ready to be attached to the machine drive housing.

FIG. 19B shows the same assembly as in FIG. 19A but with the removable belt assembly lowered in contact with the machine drive housing.

FIG. 19C is a side view of FIG. 19B.

FIG. 19D is the same view of FIG. 19C but with its removable belt assemble swiveled into its lowered horizontal operating position.

FIG. 19E is the end view of FIG. 19D showing the removable belt assembly in its locked coupling engaged position.

FIG. 19F shows a three, triple removable belt feeding system.

FIG. 19G is the same view as FIG. 19F, but with its center removable belt assembly being lifted up and removed.

DETAILED DESCRIPTION OF THE INVENTION

While the various features of this invention are hereinafter described and illustrated as a Belt Sorting System for tablets, it is to be understood that the various features of this invention can be used singly or in various combinations thereof for a Belt Sorting System as can hereinafter be appreciated from a reading of the following description.

FIG. 1 shows a rear-side view of the invention. The tablets are place in the hopper 1, and are fed out by the three cleated belts 6, in an upwards direction, being guided on both sides by the triple lane tablet guide block 13. As they are sorted out into one single line along each lane 78, any doubled up tablets will be deflected off to the side by the tablet deflector assembly 10. The single row of tablets will then be guided around the exit chute 9, downwards towards the tablet sensors, gates below.

FIG. 2A is a side cross section view of the invention with capsule shaped tablets 2, in it. The hopper 1 is filled with capsule shaped tablets 2, and with the pusher bar 5 at the bottom of it. Under the hopper 1, there is a cleated belt 6, in which transfers the tablets in a single row towards the tablet deflector assembly 10, and then the exit chute 9. The tablets 2, are guided along the center of the cleated belt 6, by the sides of the triple lane tablet guide block 13. The tension roller 8 is under the cleated belt 6, ensuring that the cleated belt 6, is tight on both the drive pulley 11, and the idler pulley 12.

FIG. 2B is a top view showing the tablet flow of the invention. It shows how all the tablets 2, are aligned and spaced out by the cleated belt 6. There are three lanes 78, and the pusher bar 5 is shown with three push fingers 79, one for each lane 78. Also the deflector assembly 10 shows how the deflector paddles 24 deflect the tablets 2, to the side.

FIG. 2C is a cross section view showing the tablet circulation within the hopper 1. As the push finger 79 advances into the tablet 2 path at the bottom of the hopper 1, just above the cleated belt 6, it pushes the tablets 2 forward along the cleated belt 6 centerline. As it pushes these tablets 2 forward, it dislodges the upper tablets 2 with in the bottom of the hopper 1, thus causing these tablets 2 to fall downwards onto the moving cleated belt 6, and also preventing possible tablet 2 jambs within the hopper 1. This helps fill the empty area between each belt cleat 18 below. With the cleated belt 6 moving forward under the stationary mass of tablets 2 above, the belt cleats 18, causes a tablet 2 turning, bouncing and dislodging action. This action helps break up any above hopper 1 jambs, and helps sort and place the tablets 2 in between the cleated belt 6 cleats 18.

FIG. 3A shows an isometric view of a single row cleated belt 6. Here only one inline, equally spaced set of belt cleats 18 are placed on the center line of the cleated belt 6.

FIG. 3B is an isometric view of a triple row cleated belt 72, with offset cleats 18. There are three separate rows of belt cleats 18, equally spaced, but are shown here with an offset 82 to each other tooth row. This offset 82 could be equal or could be gradual towards one side of this triple row cleated belt 72.

FIG. 3C shows the top view of view A-A in FIG. 3B. Here the tablets 2 are all in line with each other along the center line of the triple row cleated belt 72. The cleats 18 are shown with an offset 82 to each other cleat row, thus having the tablets 2, to be discharged at different points to each other.

FIG. 3D is the view A-A of FIG. 3B, showing the offset 82 between each of the tablets 2, as they drop off the end of the triple row cleated belt 72.

FIG. 4A shows a side view of a cleated belt 6, with capsule shaped tablets 2 along the center line of it. With a fix spacing 83, it shows how different lengths of tablets 2 and 73, could be used with this same cleated belt 6. Also it shows how the tablets 2 could be fitted within the cleat space 83 between each of the cleats 18. Only an end of the tablet 80, has room to fit in between a tablet 2 that is already between two cleats 18. In this position, the nose in tablet 80 will be sticking out as shown either in the forward or rear facing position. The piggy back tablet 81, in which is lying on top of another tablet 2, will slide backwards due to gravity caused by the vertical slope of the cleated belt 6. This tablet 81 will then drop off into an empty space 83 between the two cleats 18. The spacing 83 between the two cleats 18, must be smaller than two times the overall length of the smallest tablet 2, and larger than the overall length of the longest tablet 2 that will be used with the same cleated belt 6.

FIG. 4B shows a side view of a cleated belt 6 with round tablets 3 on it. The spacing 83 should be smaller than 1.75 times the diameter of the tablet 3, and not smaller than the diameter of the tablet 3. This way only one tablet can fit into the space 83 at a time. If there was a second level of tablets 3 like tablet 85, this tablet would be knocked off downwards due to gravity, or will roll off into an empty space 83 with in the cleat 18 path. The longer in length 122 of cleat 18, the greater the spacing will be between each tablet at the cleated belt 6 exit point.

FIG. 4C is a side view of a cleated belt 6, showing how different diameter tablets will fit into a fix space 83. As stated in FIG. 4B, only one tablet diameter should be able to fit into any given space 83. Tablet 3 diameter shown here, is too small for the space 83, as this space 83 allows two tablets 3 to sit side by side. The principle of this invention is to be able to maintain a space between each tablet, in order to be able to detect them, count them and index them easier and more accurately.

FIG. 4D shows a side view of a cleated belt 6 on a low positive incline 114. The round piggyback tablet 115 will have the tendency to stay on top of the other lower round tablets 4. The dive bombing tablet 90 will stay in this upwards position due to the lack of gravity pull, trying to pull it out. Tablet 113 sitting on the cleat 18 could stay in this position due to the low belt angle incline 114, and the piggyback tablet 81 could stay on top of the lower tablet 2 also due to the low belt incline angle 114.

FIG. 4E is the same view as FIG. 4D, except that the positive incline angle 114 is greater. The same tablets are shown in the same position on the cleated belt 6 as in FIG. 4D. The round tablet 115 now wants to roll off the lower round tablets 4. Tablet 2 is still held firmly by the cleat 18. The dive bombing tablet 90 will now slide out due to the increase belt angle 114. Tablet 113 sitting on the cleat 18 will now slide off, and the piggyback tablet 81 will also slide off due to gravity.

FIG. 4F is a side view of a cleated belt 6 on a high incline angle, showing how a round tablet 3 and two capsule tablets 2 sit against the cleats 18. Also the geometry of how their center of gravity affects them from being rejected from the cleat 18. Shown here is the maximum height 105 of the cleat 18, to not being higher than the top of the tablet 2. If the cleat 18 is higher than the tablet 2, it could physically stop the piggyback tablet 81 from sliding off the top of tablet 2.

FIG. 4G shows a typical cross section of the cleated belt 6 between the two side guides 21 and 22 of the tablet guide block 13. The height 105 of the cleat 18 should be as high or lower than the overall height of the tablet. The width 106 of the cleat 18 should be smaller than the width of the tablet, but ideally not smaller than one half the width of the tablet. The overall size of the cleat 18, is not dependant on the shape or type of tablet, but just by the tablets overall size.

FIG. 4H shows a side view of a slope and straight profile cleated belt 6. A football shaped tablet 117 is being held against the belt 6 by the sloped surface 86 on the sloped profile cleat 19. Since the football shaped tablet 117 cleat contact point 86 is higher than its center line 124, this slope profile cleat 19 will still hold the tablet 117 in place even at a higher incline belt angle. The football shape tablet 123 with the straight profile cleat 18, will have a greater tendency to slide up and off the cleat 18 as shown with the football shape tablet 119.

FIG. 5A is an isometric view of a triple lane tablet guide 13. This is a one removable change part tablet guide block, show with three lanes 78, equally spaced, and with three fixed lane width 88.

FIG. 5B is an isometric view of an adjustable three lane tablet guide system. There are three sets of equally spaced LH. tablet guides 21 and RH. tablet guides 22. Each of the three lanes 78 widths are adjustable. All the tablet guides 21 and 22 are attached to two guide cross supports 23. Unlike the fixed lane width tablet guide block 13 in FIG. 5A, this one can suite and adjust for all sizes and shapes of tablets.

FIG. 6A shows the end view of FIG. 6B. Shown here is one tablet 2 along the bottom of the cleated belt 6, being pushed forward by the cleat 18. The lane width 87 is to be slightly larger than the width of the tablet 2. The two sloped inside surfaces 89, guides the tablets 2 to the center and cleats 18 of the cleated belt 6. The two piggyback tablets 81 will side off into an empty cleat belt pocket behind.

FIG. 6B Is an isometric view of FIG. 2B view "A". Shown here are tablets 2 being guided from the hopper 1, on the cleated belt 6, between the two tablet guides 21 and 22. The tablets 2 are being sorted into one single line. Any top piggyback tablets 81 will have a tendency to slide backwards and into an empty cleat pocket. The inside surface 89 of both the tablet guides 21 and 22 are sloped to direct and to force, due to gravity, the tablets 2 into the cleat pockets on the cleated belt 6.

FIG. 6C is the same view of FIG. 6B, but shown with round tablets 3. The two sloped inside surfaces 89, guides the round tablets 3 downwards onto the moving cleated belt 6. There should only be one tablet 3 per cleat pocket. A piggyback tablet 109 will roll or fall off downwards to an empty cleat belt pocket below.

FIG. 6D is the end view of FIG. 6C. The function is the same as stated in FIG. 6A, but showing it using round tablets 3.

FIG. 7A shows an isometric view of FIG. 2B view "B". After the tablets 2 are guided by the two sloped side surfaces 89, the piggyback tablets 81 are then pushed towards the center of the cleated belt 6 by the two curved side surfaces 27. The sloped flat surfaces 28 are ramps to move the rejected tablets 2 from a more forward position, over past the curve side surfaces 27 back into the tablet flow between the two sloped side surfaces 89.

FIG. 7B is a top view of FIG. 2B, view "B" showing the tablet 2 flow. Here the piggyback tablet 91 is guided to the center line of the cleated belt 6 by the two curved side surfaces 27.

FIG. 7C is another view of FIG. 24, view "B", showing how dive-bomb tablets 90 are guided towards the center of the cleated belt 6 by the two curved side surfaces 27.

FIG. 7D is a top view of FIG. 2B, view "B". The tablet 2 is shown 90 degrees to the center line of the cleated belt 6. When the tablet 2 comes into contact with the two curved side surfaces 27, it will cause the tablet 2 to pivot into line with the tablet flow.

FIG. 8A is an isometric view of FIG. 2B, view "B" showing the same principles as stated in FIG. 7A, but with showing it with round tablets 3.

FIG. 8B is a top view of view of FIG. 2B, showing how the round tablets 4 are aligned in a straight row by the two curved side surfaces 27.

FIG. 9 is an isometric, view of FIG. 2B, view "C" showing how tablets 2 are being pushed forward by the belt cleat 18. As the belt cleat 18 moves forward, it will be pushing the tablet 2. The tablet 2 will then start moving upwards the slope 25 until the point that the belt cleat 18 will pass underneath the tablet 2. This eliminates the chance of cleat 18 trapping the tablet 2 at this exit point. The tablet 2 will finally stop moving forward once it reaches the tablet stop 26.

FIG. 10A is an isometric view of the tablet deflector assembly 10. The tablet deflector holder 110 is adjustable in height to adjust for the different tablet heights. The deflector paddles 24 are flexible, could be made out of rubber, and are shown here with a curved surface 92. This curved surface 92 increases its rigidity and also better guides the tablets 2 to the side of the tablet path. However this surface could also be straight. Shown here are two deflector paddles 24 for each tablet lane, one after the other. More of these deflector paddles 24 could be used if required.

FIG. 10B shows an isometric view of how a deflector paddle 24 is removed. The deflector paddle 24 is flexible and has two flexible tabs 76 on the top of it. These two tabs 76 are bent 90 degrees to each other and will pass through the lock grooves 74. The deflector paddle 24 is then slid through until its two notches 77 bottoms out on the tablet deflector holder 110. Then the two tabs 76 are bent back to its relax state in line with the rest of the deflector paddle 24.

FIG. 10C shows a top view of FIG. 2B, view "C" showing how the double tablets 2 are guided/pushed to the side of the center of the cleated belt 6 by the deflector paddles 24. Once these tablets 2 are pushed to the side, they will then slide downwards due to the upwards slope in the cleated belt 6, due to gravity.

FIG. 10D is a side view of FIG. 10C, showing only one deflector paddle 24. The deflector paddle 24 is adjusted vertically to just clear the tops of the tablets 2 in which are lying flat against the cleated belt 6. This height 94 will only allow one layer of tablets 2 to pass by to the exit point 125. Although only one deflector paddle 24 is shown, several others in line could be added. Also the height 94 of these deflector paddles 24 could be different to gradually push each tablet 2 off to the side.

FIG. 10E is the same view and has the same function as FIG. 10D. The only difference is that the tablet 3 shown is a round shape one.

FIG. 11A and FIG. 11B are isometric views of a triple lane tablet pusher 5. Here shown are three push fingers 79 in which will extend inside the bottom of the hopper 1. The width 30 of these push fingers 79 should to be as wide as possible, but smaller than the width of the tablet. The wider the better. There are to be one push finger 79 per row of cleats 18.

FIG. 11C this is a side view showing a push finger 79 in its proper position with a gap 32 between it and the top of the belt cleat 18. This push finger 79 should be as close as possible to just clear the top of the cleat 18 and the tablet being used. Here the push finger 79 is being pushed forward and pulled back by an air cylinder 31. Although an air cylinder 31 is shown, the push finger 79 could be moved back and forth by any other means.

FIG. 11D is the same view as FIG. 11C, but having the air cylinder 31 mounted lower down offset to the centerline of the push finger 79. The air cylinder 31 is connected to a push bar 15, in which transfers the moving action up to the push finger 79. Although an air cylinder 31 is shown here, any other mechanical system could be used to achieve the same results.

FIG. 11E is a hopper 1 bottom cutaway view showing the push finger 79 in its retracted position. Its face 95 is flush with the back wall of hopper 1. The push finger 79 is just above the belt cleat 18. The hopper 1 is filled with tablets 2 in which are in contact with the belt 6.

FIG. 11F is the same view as of FIG. 11E, but showing the push finger 79 moved forward in its extended position. While the push finger 79 extends. It will push forward all the tablets 2 in front of it, thus dislodging any possible jamb that could occur with in the bottom of the hopper 1. Also this pushing action will help drive the tablets 2 forward along the belt 6.

FIG. 11G is the same view as of FIG. 11E, now showing the push finger 79 returned back to its starting retracted position. As the push finger 79 retracts, it will leave an empty space 33. The tablets 2 above and on the sides of this empty space 33, will no longer be supported by the tablets 2 that are no longer there, thus these tablets 2 will fall down and collapse into this void are 33. This action will dislodge any jamb tablets 2 and will help with filling any empty pockets between the cleats 18.

FIG. 12A is an isometric view of a replaceable tablet exit guide 36. This guide 36 has an opening for a tablet width 34, and a tablet height 35. Wider the tablet, then wider the width 34. One of these exit guides 36 could be used for different shape and sizes of tablets as long as they do fit with in the height and width of it. This replaceable tablet guide 36 is to guide the tablet from the exit point 125 on the tablet guide block 13, as shown in FIG. 12C, around the center line if the idler pulley 12, then downwards towards the tablet count sensor below.

FIG. 12B is an isometric, view of a replaceable tablet exit guide 36, similar to FIG. 12A, but showing its opening wider for larger width 34 and height 35 tablets.

FIG. 12C is a cross section view of the replaceable tablet exit guide 36, along with the invention cleated belt 6, and idler pulley 12. Shown here are tablets 2, one per spacing between each set of belt cleats 18. As the tablets 2 exit the tablet guide block 13 in line, they are all in one layer and in a straight line to each other. They then enter the tablet exit guide 36, and are driven around the outside radius 96 of this exit guide 36 by centrifugal force. Faster the tablets 2 linear speed, then the more drawn to this outside radius 96 the tablets 2 will be. This outside radius 96 will stabilize and guide the tablets 2 around, then in a straight line downwards towards the tablet count sensor. This guide 36 forms a pocket 126 around each set of belt cleats 18, thus trapping each tablet 2 in its independent space. This action will ensure a space between each exiting/falling tablet 2 and will ensure a straight projection downwards fall. Also since each tablet 2 it held loosely between the outside radius 96 and the two cleats 18, when the cleated belt 6 is stopped, the flow of tablets 2 will also stop accurately as well. Also as the linear speed of the belt 6 is increased or decreased, the tablet 2 feeding feed will change proportionally as well.

FIG. 12D is the same view of FIG. 12C but showing large diameter round tablets 4. As the linear speed of these tablets 4 increase, they will be pressed against the outside radius 96 of the guide 36, and held between in the pocket 126 by the two belt cleats 18. The principle is the same as in FIG. 12C.

FIG. 13A is an isometric view of a replacement tablet exit guide 111 incorporating a tablet top centering groove 37. This exit guide 111 function is the same as with the guide 36 in FIG. 12A, but incorporates a top centering groove 37 to help guide and to center the tablet 2 as they travel around and in the top centering groove 37 as shown in FIG. 13B.

FIG. 13B is the same view and has the same function as FIG. 12D, but also shows how this replacement tablet exit guide 111, guides the round tablets 4 around the top centering grove 37.

FIG. 13C is the section view of FIG. 13B, view "A". Shown here is how the top centering grove 37, helps guide and stabilize the tablet 4 vertically and on center of the tablet exit guide 111.

FIG. 13D is similar to FIG. 13C, but with showing a capsule shape tablet 2 being guided by the top centering groove 37.

FIG. 14A is a cross section view of the cleated belt 6, showing how the two vacuum holes 39 and 40 function. Shown on this cleated belt 6, are different types of tablets in different configurations. When there is only one tablet between two sets of cleats 18, the two vacuum holes 39 and 40 will both try to suck the tablet 38 firmly to the surface of the cleated belt 6, and also will remove any dust from the tablet or the cleated belt 6 before the tablets exit at the discharge end of this cleated belt 6. Since Only the bottom tablet 38, will be held tightly against the cleated belt 6 due to vacuum, this allows any piggybacking or dive-bombing tablets like tablet 2 to remain unstable and could easily be removed during its upwards travel up the cleated belt 6.

FIG. 14B is an isometric cut away section view of a belt assembly, showing how the vacuum belt system functions. There are vacuum holes 39 and 40 in the cleated belt 6. Dust is sucked downwards through these holes 39 and 40 into the vacuum channel 43. There is a vacuum channel 43 under the center line for each row of cleats 18 running the length of the belt vacuum guide block 42. The vacuum channel 43 then exits to the bottom, into a common dust chamber 44 located at the far end of the vacuum guide block 42 under the hopper 1. This dust chamber 44 has at least one opening 112 in the bottom of it to allow the dust and the vacuum to be removed through the vacuum manifold 14. This manifold 14 is connected to a main vacuum source not shown. The cleated belt 6 is traveling and side guided in a machined out channel 97.

FIG. 14C is a section view of FIG. 14B. This view shows the vacuum paths through the two vacuum holes 39 and 40 downwards into the three vacuum channels 43 as shown. Then from the vacuum channels 43 into the common dust chamber 44. The dust and vacuum then travels downwards through the two openings 112 in the bottom of the dust chamber 44 into the vacuum manifold 14. The two openings 112 in the bottom of the dust chamber 44 are located in between each of the cleated belts 6. Another variant of this Is to have the vacuum manifold 14 connect into the side of the dust chamber 44, in between the top and bottom cleated belt 6 sections.

FIG. 15A is a bottom isometric view of the removable belt assembly showing an adjustable belt tensioner roller 8. This adjustable tension roller 8 surface is grooved to act as the cleated belt 6 side guide 98. This belt tensioner roller 8 is adjustable in height by mounting it into different pre-set holes 46 locations in the back plate 45. By moving the tensioner roller 8 more upwards, the cleated belt 6 tension will become greater on the two pulleys 11 and 12. To remove the cleated belt 6 from this removable belt assembly, simply remove the tensioner roller 8, and the cleated belt 6 will slacken and will be able to be removed by hand.

FIG. 15B is an isometric view of a fixed air cylinder 48, applying upwards pressure onto a yoke bracket 47. The yoke bracket 47 lifts its belt tensioner roller 8 and axle 99 up against the bottom of the cleated belt 6, thus creating tension to the cleated belt 6.

FIG. 15C is a top isometric view of a fix tensioning roller system. There is a fixed tensioner bracket 51, and it's holding a removable tensioner roller 8 and axle 99. When the removable belt assembly is lowered onto this belt tensioning system, the cleated belts 6 will flex upwards and tension around the two belt pulleys 11 and 12. FIG. 15D shows the principle of how this tensioner system functions.

FIG. 15D is a side view of how the tensioner system in FIG. 15C functions. The drive pulley 11 is fixed and the idler pulley 12 and belt assembly are rotated downwards onto the fixed tension roller 8 below. The tension roller 8 deflects the cleated belt 6 upwards creating tension within the cleated belt 6.

FIG. 16A is an isometric exploded view of a fix belt assembly. This fixed belt assembly is permanently attached to the machine and only its change parts can be removed for cleaning. The fix portion of the belt assembly comprises of the drive housing 17, the drive pulley 11, the idler pulley 12, the back plate 45, its two support pins 54 and center pin 55. The cleated belts 6, belt vacuum guide block 42 and the tension roller 8 are all removable.

FIG. 16B is a side view of FIG. 16A with the cleated belt 6 loose over the two pulleys 11 and 12. Once the tension roller 8 is removed, the cleated belt 6 can now be slid over the two pulleys 11 and 12 by hand, due to the slack 52 in the cleated belt 6.

FIG. 16C is the same view as of FIG. 16B, with the belt tensioning roller 8 engaged, attached to the back plate 45. The cleated belt 6 is now in tension and cannot be removed or slid off of the two pulleys 11 and 12.

FIG. 17A is a top isometric view of the removable belt assembly. This entire belt assembly is removable from its drive system and the machine for cleaning or for change over. The tension roller 8 remains a part of this belt assembly as it is removed. All the belt components are attached to the back plate 45.

FIG. 17B is an exploded isometric view of FIG. 17A, showing it with its belt vacuum guide block 42 and its belt tension roller 8 slid out forward from its back plate 45. The three cleated belts 6 could be removed by sliding them forward off of the two pulleys 11 and 12 after the belt tension roller 8 has been removed.

FIG. 17C is the back side isometric view of FIG. 17A with all its removable parts taken off of it.

FIG. 18 is a rear isometric view of the removable belt assembly 61 showing how the drive coupling 62 and the driven coupling 59 engages together. The drive housing 17 is fixed to the baseplate of the machine and is driven by a drive belt 63. The projected profile on the drive coupling 62 will slide into the driven coupling 59 female profile. The alignment groove 66 will align the two couplings 59 and 62 by aligning itself with the support post 67. The lock pin 58 will engage inside the lock groove 68 of the support pin 67 preventing the two couplings 59 and 62 from disengaging from each other, once the two faces 100 and 101 are in contact with each other.

FIGS. 19A, B, C, D and E, shows how the removable belt assembly 61 is attached to the fixed drive housing 17. FIG. 19A shows an isometric cutaway view of the removable belt assembly 61 held by hand, in line, and lowered vertically over the support post 67.

FIG. 19B shows how the removable belt assembly 61 is lowered and its pivot block 57 guides the support post 67 into its alignment groove 66. The support post 67 will then support the weight of belt assembly 61 still in this vertical position. The stop 69, a part of the drive housing 17, acts as a positive stop between it and the removable belt assembly 61 face 100. This stop 69 maintains a minimum gap between the two couplings 59 and 62.

FIG. 19C is the side view of FIG. 19B. The pivot groove 102 on the removable belt assembly 61 is in contact with the support post 67. The pivot finger 103 is hooked under between the support post 67 and the slope stop 70 on the drive housing 17. The stop flat 104 on the end of the removable belt assembly 61, is in contact with the slope stop 70. When these two stops 104 and 70 are in contact with each other, the removable belt assemble 61 cannot rotate in a clockwise orientation from this position. The removable belt assembly 61 can only be rotated counter clockwise to the horizontal position as shown in FIG. 19D.

FIG. 19D is the same view as in FIG. 19C. Here the removable belt assembly 61 is now in its horizontal position. The support post 67 is tightly in the pivot grove 102. The pivot finger 103 is trapped under between the support post 67 and the slope stop 70, thus holding the entire removable belt assembly 61 in place. In this position, the two couplings 59 and 62 will be aligned with each other.

FIG. 19E is the end view of FIG. 19D. In this position, the removable belt assembly 61 can now be pushed to the right towards the drive housing 17 until the two faces 100 and 101 come into contact with each other. The stop 69 is no longer in use as the two couplings 59 and 62 are now aligned with each other. The removable belt assembly 61 can now be locked in place by its lock pin 58, engaged into the lock groove 68 as shown in FIG. 18.

FIG. 19F is an isometric side top view of a three, triple removable belt assembly 61 system. There is a separate drive housing 17 for each of the removable belt assemblies 61. Although three sets of removable belt assemblies 61 are shown, any number of individual or sets of cleated belts assemblies could be ganged together to form one larger cleated belt sorting machine.

FIG. 19G is the same view and assembly as in FIG. 19F. Here the center removable belt assembly 61 is rotated upwards and is being removed from its drive housing 17. Also the clamp finger 107 and the clamp guide 108 is shown. The clamp finger 107 is a rotary finger in which clamps the removable belt assembly 61 to the machine base plate 49.

The invention claimed is:

1. An object counter comprising:
a base;
a conveyor belt mounted to said base to transport in an uphill direction, the conveyor belt having regularly spaced object retaining posts for retaining single objects on said conveyor belt and having at least one lane for transporting objects in a single file manner from a lower feed end to an upper discharge end, said at least one lane having lateral guide members for helping objects to settle in said at least one lane between said retaining posts during transport on said conveyor belt between said lower feed end and said upper discharge end;
an object feed device arranged at the lower feed end of the conveyor belt for providing a quantity of objects to the conveyor belt;
a deflector arranged over said at least one lane before said upper discharge end for removing objects from said at least one lane that settle on top of objects settled in said at least one lane between said retaining posts; and
an item detector arranged at said upper discharge end for detecting the passage or discharge of individual objects from said at least one lane.

2. The counter as defined in claim 1, wherein the lateral guide members are stationary guide members.

3. The counter as defined in claim 2, wherein the stationary guide members provide a V-shaped trough having said conveyor belt as a bottom with the retaining posts moving between sides walls of said trough.

4. The counter as defined in claim 2, wherein the stationary guide members are detachable from said conveyor belt.

5. The counter as defined in claim 2, wherein the stationary guide members are adjustable in a widthwise spacing therebetween.

6. The counter as defined in claim 2, wherein the deflector is integrated with said stationary guide members.

7. The counter as defined in claim 1, wherein the lateral guide member are integral with the conveyor belt and move with the retaining posts.

8. The counter as defined in claim 7, wherein the conveyor belt comprises a chain belt having links formed to provide said lateral guide member and said retaining posts.

9. The counter as defined in claim 1, wherein said retaining posts have forwardly angled object contact surfaces for supporting objects to be retained against said belt.

10. The counter as defined in claim 1, further comprising a source of negative air pressure for collecting dust from said objects.

11. The counter as defined in claim 10, wherein said conveyor belt is provided with apertures and said source of negative air pressure is arranged to draw air through said conveyor belt.

12. The counter as defined in claim 11, wherein apertures are located said near said retaining posts for additionally providing retaining suction for objects settled in said at least one lane.

13. The counter as defined in claim 10, wherein said lateral guide members comprise a channel for said negative air pressure and have at least one aperture for drawing in air from said at least one lane.

14. The counter as defined in claim 1, wherein the deflector further comprises a track associated with the lateral guide members of said at least one lane to cause objects to fall back down between said lateral guide members above said object feed device to find an opportunity to fill an empty space between two adjacent ones of said guide posts.

15. An object counter comprising:
a conveyor belt having regularly spaced object retaining posts for retaining single objects on said conveyor belt and having at least one lane for transporting objects in a single file manner from a lower feed end to an upper discharge end, said at least one lane having lateral guide members for helping objects to settle in said at least one lane between said retaining posts during transport on said conveyor belt between said lower feed end and said upper discharge end;
an object feed device arranged at the lower feed end of the conveyor belt for providing a quantity of objects to the conveyor belt;
a deflector arranged over said at least one lane before said upper discharge end for removing objects from said at least one lane that settle on top of objects settled in said at least one lane between said retaining posts; and
an item detector arranged at said upper discharge end for detecting the passage or discharge of individual objects from said at least one lane, wherein the conveyor belt is arranged at an angle of 25 degrees to 60 degrees with respect to horizontal.

16. The counter as defined in claim 1, wherein the conveyor belt comprises a variable angle mounting to adjust an angle of said belt with respect to horizontal.

17. The counter as defined in claim 1, wherein the object feed device further comprises an agitator for helping said objects flow into said at least one lane.

18. The counter as defined in claim 17, wherein the agitator comprises a finger arranged to move within each one of said lanes.

19. The counter as defined in claim 1, wherein said at least one lane comprises at least three lanes.

20. The counter as defined in claim 19, wherein an offset is provided among said posts of said lanes so that said objects are discharged from said belt one at a time.

21. The counter as defined in claim 1, wherein said conveyor belt comprises a common belt for at least two of said lanes.

22. The counter as defined in claim 1, wherein said conveyor belt comprises a plurality of belts for at least two of said lanes.

23. The counter as defined in claim 1, further comprising a motor for driving said conveyor belt, and a motor controller for controlling a speed of said conveyor belt to deliver objects at said discharge end at a predetermined rate.

24. The counter as defined in claim 1, wherein said item detector comprises a channel for each corresponding one of said at least one lane, said channel guiding an object around said upper discharge end of said conveyor belt.

25. The counter as defined in claim 24, wherein said channel provides a pocket for containing said objects, wherein objects at said discharge end are contained between bounding retaining posts and walls of said channel and held before release by an upstream one of said bounding retaining posts.

26. The counter as defined in claim 1, further comprising a gate at said discharge end for controllably catching and releasing objects.

27. The counter as defined in claim 1, wherein said object feed device comprises a hopper having at least one lateral wall for supporting a quantity of said objects over said lower feed end of said belt, and has an opening at an upper side to allow objects carried by the retaining posts to be carried along the at least one lane of the conveyor belt towards said upper discharge end.

28. The counter as defined in claim 1, wherein said deflector comprises a collector and delivery mechanism to collect objects removed by the deflector and deliver the objects to the object feed device.

29. A method of manufacturing a filled container filled with a predetermined count of objects, the method comprising:
providing a counter as defined in claim 1;
moving said conveyor belt to cause objects to be:
a) transported along said belt by said retaining posts out of said hopper;
b) guided by said lateral guide members to settle in said at least one lane between said retaining posts during transport from said hopper to said discharge end;
c) removed from said lanes by said deflector before said upper discharge end in the case of objects that are carried on top of objects settled in said at least one lane between said retaining posts;
counting said objects at said discharge end; and
controllably dropping said objects from said discharge end into said container until a predetermined fill count is reached.

* * * * *